(12) United States Patent
Snyder et al.

(10) Patent No.: US 10,684,752 B2
(45) Date of Patent: Jun. 16, 2020

(54) COMPUTER IMPLEMENTED METHODS AND APPARATUS FOR RESPONDING TO ACTIONABLE TEXT PATTERNS IN A FEED ITEM

(71) Applicant: salesforce.com, inc., San Francisco, CA (US)

(72) Inventors: Benjamin Snyder, Oakland, CA (US); Vahn K. Phan, Oakland, CA (US); Mustafa O. Al-Alami, San Francisco, CA (US); Jason Aaron Ellis, San Leandro, CA (US)

(73) Assignee: salesforce.com, inc., San Francisco, CA (US)

( * ) Notice: Subject to any disclaimer, the term of this patent is extended or adjusted under 35 U.S.C. 154(b) by 1215 days.

(21) Appl. No.: 14/251,389

(22) Filed: Apr. 11, 2014

(65) Prior Publication Data
US 2014/0310608 A1    Oct. 16, 2014

Related U.S. Application Data

(60) Provisional application No. 61/811,348, filed on Apr. 12, 2013.

(51) Int. Cl.
*G06F 3/0484* (2013.01)
*G06Q 10/10* (2012.01)
*H04L 12/58* (2006.01)

(52) U.S. Cl.
CPC ....... *G06F 3/04842* (2013.01); *G06Q 10/109* (2013.01); *G06Q 10/1093* (2013.01); *G06Q 10/1095* (2013.01); *H04L 51/18* (2013.01)

(58) Field of Classification Search
CPC . H04L 51/18; G06Q 10/1093; G06Q 10/1095
See application file for complete search history.

(56) References Cited

U.S. PATENT DOCUMENTS

| 5,577,188 A | 11/1996 | Zhu |
| 5,608,872 A | 3/1997 | Schwartz et al. |

(Continued)

FOREIGN PATENT DOCUMENTS

WO    WO2014144796    9/2014

OTHER PUBLICATIONS

"Google Plus Users", Google+Ripples, Oct. 31, 2011 [retrieved on Feb. 21, 2012 from Internet at http://www.googleplusers.com/google-ripples.html], 3 pages.

*Primary Examiner* — Roland J Casillas
(74) *Attorney, Agent, or Firm* — Weaver Austin Villeneuve & Sampson LLP

(57) ABSTRACT

Disclosed are methods, apparatus, systems, and computer-readable storage media for responding to actionable text patterns in a feed item. In some implementations, a computing device receives textual input for a feed item to be published in an information feed. The computing device identifies in the textual input an actionable text pattern and transmits a portion of the actionable text pattern to a server. The computing device receives, from the server, one or more names of entities. The entities may be object records stored in a database, wherein the names of the entities match the portion of the actionable text pattern transmitted to the server. The computing device receives a selection of a first of the one or more names.

25 Claims, 16 Drawing Sheets

(56) References Cited

U.S. PATENT DOCUMENTS

| | | |
|---|---|---|
| 5,649,104 A | 7/1997 | Carleton et al. |
| 5,715,450 A | 2/1998 | Ambrose et al. |
| 5,761,419 A | 6/1998 | Schwartz et al. |
| 5,819,038 A | 10/1998 | Carleton et al. |
| 5,821,937 A | 10/1998 | Tonelli et al. |
| 5,831,610 A | 11/1998 | Tonelli et al. |
| 5,873,096 A | 2/1999 | Lim et al. |
| 5,918,159 A | 6/1999 | Fomukong et al. |
| 5,963,953 A | 10/1999 | Cram et al. |
| 5,983,227 A | 11/1999 | Nazem et al. |
| 6,092,083 A | 7/2000 | Brodersen et al. |
| 6,161,149 A | 12/2000 | Achacoso et al. |
| 6,169,534 B1 | 1/2001 | Raffel et al. |
| 6,178,425 B1 | 1/2001 | Brodersen et al. |
| 6,189,011 B1 | 2/2001 | Lim et al. |
| 6,216,133 B1 | 4/2001 | Masthoff |
| 6,216,135 B1 | 4/2001 | Brodersen et al. |
| 6,233,617 B1 | 5/2001 | Rothwein et al. |
| 6,236,978 B1 | 5/2001 | Tuzhilin |
| 6,266,669 B1 | 7/2001 | Brodersen et al. |
| 6,288,717 B1 | 9/2001 | Dunkle |
| 6,295,530 B1 | 9/2001 | Ritchie et al. |
| 6,324,568 B1 | 11/2001 | Diec et al. |
| 6,324,693 B1 | 11/2001 | Brodersen et al. |
| 6,336,137 B1 | 1/2002 | Lee et al. |
| D454,139 S | 3/2002 | Feldcamp et al. |
| 6,367,077 B1 | 4/2002 | Brodersen et al. |
| 6,393,605 B1 | 5/2002 | Loomans |
| 6,405,220 B1 | 6/2002 | Brodersen et al. |
| 6,411,949 B1 | 6/2002 | Schaffer |
| 6,434,550 B1 | 8/2002 | Warner et al. |
| 6,446,089 B1 | 9/2002 | Brodersen et al. |
| 6,535,909 B1 | 3/2003 | Rust |
| 6,549,908 B1 | 4/2003 | Loomans |
| 6,553,563 B2 | 4/2003 | Ambrose et al. |
| 6,560,461 B1 | 5/2003 | Fomukong et al. |
| 6,574,635 B2 | 6/2003 | Stauber et al. |
| 6,577,726 B1 | 6/2003 | Huang et al. |
| 6,601,087 B1 | 7/2003 | Zhu et al. |
| 6,604,117 B2 | 8/2003 | Lim et al. |
| 6,604,128 B2 | 8/2003 | Diec et al. |
| 6,609,150 B2 | 8/2003 | Lee et al. |
| 6,621,834 B1 | 9/2003 | Scherpbier et al. |
| 6,654,032 B1 | 11/2003 | Zhu et al. |
| 6,665,648 B2 | 12/2003 | Brodersen et al. |
| 6,665,655 B1 | 12/2003 | Warner et al. |
| 6,684,438 B2 | 2/2004 | Brodersen et al. |
| 6,711,565 B1 | 3/2004 | Subramaniam et al. |
| 6,724,399 B1 | 4/2004 | Katchour et al. |
| 6,728,702 B1 | 4/2004 | Subramaniam et al. |
| 6,728,960 B1 | 4/2004 | Loomans et al. |
| 6,732,095 B1 | 5/2004 | Warshavsky et al. |
| 6,732,100 B1 | 5/2004 | Brodersen et al. |
| 6,732,111 B2 | 5/2004 | Brodersen et al. |
| 6,754,681 B2 | 6/2004 | Brodersen et al. |
| 6,763,351 B1 | 7/2004 | Subramaniam et al. |
| 6,763,501 B1 | 7/2004 | Zhu et al. |
| 6,768,904 B2 | 7/2004 | Kim |
| 6,772,229 B1 | 8/2004 | Achacoso et al. |
| 6,782,383 B2 | 8/2004 | Subramaniam et al. |
| 6,804,330 B1 | 10/2004 | Jones et al. |
| 6,826,565 B2 | 11/2004 | Ritchie et al. |
| 6,826,582 B1 | 11/2004 | Chatterjee et al. |
| 6,826,745 B2 | 11/2004 | Coker |
| 6,829,655 B1 | 12/2004 | Huang et al. |
| 6,842,748 B1 | 1/2005 | Warner et al. |
| 6,850,895 B2 | 2/2005 | Brodersen et al. |
| 6,850,949 B2 | 2/2005 | Warner et al. |
| 6,907,566 B1 | 6/2005 | McElfresh et al. |
| 7,062,502 B1 | 6/2006 | Kesler |
| 7,069,231 B1 | 6/2006 | Cinarkaya et al. |
| 7,069,497 B1 | 6/2006 | Desai |
| 7,100,111 B2 | 8/2006 | McElfresh et al. |
| 7,181,758 B1 | 2/2007 | Chan |
| 7,269,590 B2 | 9/2007 | Hull et al. |
| 7,289,976 B2 | 10/2007 | Kihneman et al. |
| 7,340,411 B2 | 3/2008 | Cook |
| 7,356,482 B2 | 4/2008 | Frankland et al. |
| 7,373,599 B2 | 5/2008 | McElfresh et al. |
| 7,401,094 B1 | 7/2008 | Kesler |
| 7,406,501 B2 | 7/2008 | Szeto et al. |
| 7,412,455 B2 | 8/2008 | Dillon |
| 7,454,509 B2 | 11/2008 | Boulter et al. |
| 7,508,789 B2 | 3/2009 | Chan |
| 7,599,935 B2 | 10/2009 | La Rotonda et al. |
| 7,603,331 B2 | 10/2009 | Tuzhilin et al. |
| 7,603,483 B2 | 10/2009 | Psounis et al. |
| 7,620,655 B2 | 11/2009 | Larsson et al. |
| 7,644,122 B2 | 1/2010 | Weyer et al. |
| 7,668,861 B2 | 2/2010 | Steven |
| 7,698,160 B2 | 4/2010 | Beaven et al. |
| 7,730,478 B2 | 6/2010 | Weissman |
| 7,747,648 B1 | 6/2010 | Kraft et al. |
| 7,779,039 B2 | 8/2010 | Weissman et al. |
| 7,779,475 B2 | 8/2010 | Jakobson et al. |
| 7,827,208 B2 | 11/2010 | Bosworth et al. |
| 7,853,881 B1 | 12/2010 | Aly Assal et al. |
| 7,945,653 B2 | 5/2011 | Zukerberg et al. |
| 8,005,896 B2 | 8/2011 | Cheah |
| 8,014,943 B2 | 9/2011 | Jakobson |
| 8,015,495 B2 | 9/2011 | Achacoso et al. |
| 8,032,297 B2 | 10/2011 | Jakobson |
| 8,073,850 B1 | 12/2011 | Hubbard et al. |
| 8,082,301 B2 | 12/2011 | Ahlgren et al. |
| 8,095,413 B1 | 1/2012 | Beaven |
| 8,095,531 B2 | 1/2012 | Weissman et al. |
| 8,095,594 B2 | 1/2012 | Beaven et al. |
| 8,103,611 B2 | 1/2012 | Tuzhilin et al. |
| 8,150,913 B2 | 4/2012 | Cheah |
| 8,209,308 B2 | 6/2012 | Rueben et al. |
| 8,209,333 B2 | 6/2012 | Hubbard et al. |
| 8,275,836 B2 | 9/2012 | Beaven et al. |
| 8,457,545 B2 | 6/2013 | Chan |
| 8,484,111 B2 | 7/2013 | Frankland et al. |
| 8,490,025 B2 | 7/2013 | Jakobson et al. |
| 8,504,945 B2 | 8/2013 | Jakobson et al. |
| 8,510,045 B2 | 8/2013 | Rueben et al. |
| 8,510,664 B2 | 8/2013 | Rueben et al. |
| 8,549,047 B2 | 10/2013 | Beechuk et al. |
| 8,566,301 B2 | 10/2013 | Rueben et al. |
| 8,646,103 B2 | 2/2014 | Jakobson et al. |
| 8,693,649 B2 | 4/2014 | Casalaina et al. |
| 8,718,241 B2 | 5/2014 | Casalaina et al. |
| 8,745,272 B2 | 6/2014 | Casalaina et al. |
| 8,751,939 B2 | 6/2014 | Law et al. |
| 8,769,416 B2 | 7/2014 | Casalaina et al. |
| 8,898,582 B2 | 11/2014 | Law et al. |
| 8,914,539 B2 | 12/2014 | Casalaina et al. |
| 8,984,409 B2 | 3/2015 | Casalaina et al. |
| 9,063,632 B2 | 6/2015 | Beechuk et al. |
| 9,235,614 B2 | 1/2016 | Beechuk et al. |
| 9,398,156 B2 | 7/2016 | Snyder et al. |
| 9,419,863 B2 | 8/2016 | Casalaina et al. |
| 9,529,488 B2 | 12/2016 | Beechuk et al. |
| 9,569,060 B2 | 2/2017 | Al-Alami et al. |
| 2001/0044791 A1 | 11/2001 | Richter et al. |
| 2002/0072951 A1 | 6/2002 | Lee et al. |
| 2002/0082892 A1 | 6/2002 | Raffel et al. |
| 2002/0129352 A1 | 9/2002 | Brodersen et al. |
| 2002/0140731 A1 | 10/2002 | Subramaniam et al. |
| 2002/0143997 A1 | 10/2002 | Huang et al. |
| 2002/0162090 A1 | 10/2002 | Parnell et al. |
| 2002/0165742 A1 | 11/2002 | Robbins |
| 2003/0004971 A1 | 1/2003 | Gong |
| 2003/0018705 A1 | 1/2003 | Chen et al. |
| 2003/0018830 A1 | 1/2003 | Chen et al. |
| 2003/0066031 A1 | 4/2003 | Laane et al. |
| 2003/0066032 A1 | 4/2003 | Ramachandran et al. |
| 2003/0069936 A1 | 4/2003 | Warner et al. |
| 2003/0070000 A1 | 4/2003 | Coker et al. |
| 2003/0070004 A1 | 4/2003 | Mukundan et al. |
| 2003/0070005 A1 | 4/2003 | Mukundan et al. |
| 2003/0074418 A1 | 4/2003 | Coker et al. |
| 2003/0120675 A1 | 6/2003 | Stauber et al. |

(56) References Cited

U.S. PATENT DOCUMENTS

| | | |
|---|---|---|
| 2003/0151633 A1 | 8/2003 | George et al. |
| 2003/0159136 A1 | 8/2003 | Huang et al. |
| 2003/0187921 A1 | 10/2003 | Diec et al. |
| 2003/0189600 A1 | 10/2003 | Gune et al. |
| 2003/0204427 A1 | 10/2003 | Gune et al. |
| 2003/0206192 A1 | 11/2003 | Chen et al. |
| 2003/0225730 A1 | 12/2003 | Warner et al. |
| 2004/0001092 A1 | 1/2004 | Rothwein et al. |
| 2004/0010489 A1 | 1/2004 | Rio et al. |
| 2004/0015981 A1 | 1/2004 | Coker et al. |
| 2004/0027388 A1 | 2/2004 | Berg et al. |
| 2004/0128001 A1 | 7/2004 | Levin et al. |
| 2004/0186860 A1 | 9/2004 | Lee et al. |
| 2004/0193510 A1 | 9/2004 | Catahan et al. |
| 2004/0199489 A1 | 10/2004 | Barnes-Leon et al. |
| 2004/0199536 A1 | 10/2004 | Barnes-Leon et al. |
| 2004/0199543 A1 | 10/2004 | Braud et al. |
| 2004/0249854 A1 | 12/2004 | Barnes-Leon et al. |
| 2004/0260534 A1 | 12/2004 | Pak et al. |
| 2004/0260659 A1 | 12/2004 | Chan et al. |
| 2004/0268299 A1 | 12/2004 | Lei et al. |
| 2005/0050555 A1 | 3/2005 | Exley et al. |
| 2005/0091098 A1 | 4/2005 | Brodersen et al. |
| 2008/0009299 A1* | 1/2008 | Ryu ............... H04W 4/14 455/466 |
| 2008/0249972 A1 | 10/2008 | Dillon |
| 2009/0063415 A1 | 3/2009 | Chatfield et al. |
| 2009/0100342 A1 | 4/2009 | Jakobson |
| 2009/0177744 A1 | 7/2009 | Marlow et al. |
| 2010/0281057 A1* | 11/2010 | Dicke ............... G06F 17/2765 707/780 |
| 2011/0218958 A1 | 9/2011 | Warshavsky et al. |
| 2011/0225495 A1 | 9/2011 | Casalaina et al. |
| 2011/0247051 A1 | 10/2011 | Bulumulla et al. |
| 2012/0042218 A1 | 2/2012 | Cinarkaya et al. |
| 2012/0124153 A1* | 5/2012 | Carroll ............... G06Q 10/107 709/206 |
| 2012/0233137 A1 | 9/2012 | Jakobson et al. |
| 2012/0290407 A1 | 11/2012 | Hubbard et al. |
| 2013/0007648 A1* | 1/2013 | Gamon ............... G06Q 10/109 715/771 |
| 2013/0212497 A1 | 8/2013 | Zelenko et al. |
| 2013/0218948 A1 | 8/2013 | Jakobson |
| 2013/0218949 A1 | 8/2013 | Jakobson |
| 2013/0218966 A1 | 8/2013 | Jakobson |
| 2013/0247216 A1 | 9/2013 | Cinarkaya et al. |
| 2014/0032597 A1 | 1/2014 | Ellis et al. |
| 2014/0032713 A1 | 1/2014 | Phan et al. |
| 2014/0181692 A1* | 6/2014 | Gupta ............... G06F 17/276 715/753 |
| 2014/0280329 A1 | 9/2014 | Beechuk et al. |
| 2014/0280577 A1 | 9/2014 | Beechuk et al. |
| 2014/0359537 A1 | 12/2014 | Jakobson et al. |
| 2015/0006289 A1 | 1/2015 | Jakobson et al. |
| 2015/0007050 A1 | 1/2015 | Jakobson et al. |
| 2015/0095162 A1 | 4/2015 | Jakobson et al. |
| 2015/0142596 A1 | 5/2015 | Jakobson et al. |
| 2015/0172563 A1 | 6/2015 | Jakobson et al. |

\* cited by examiner

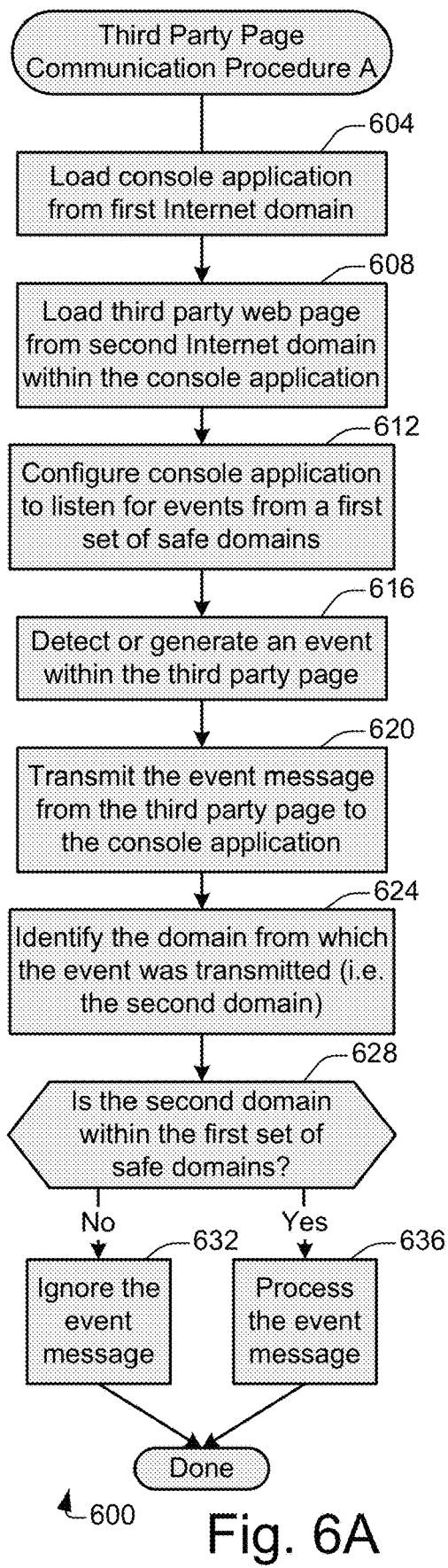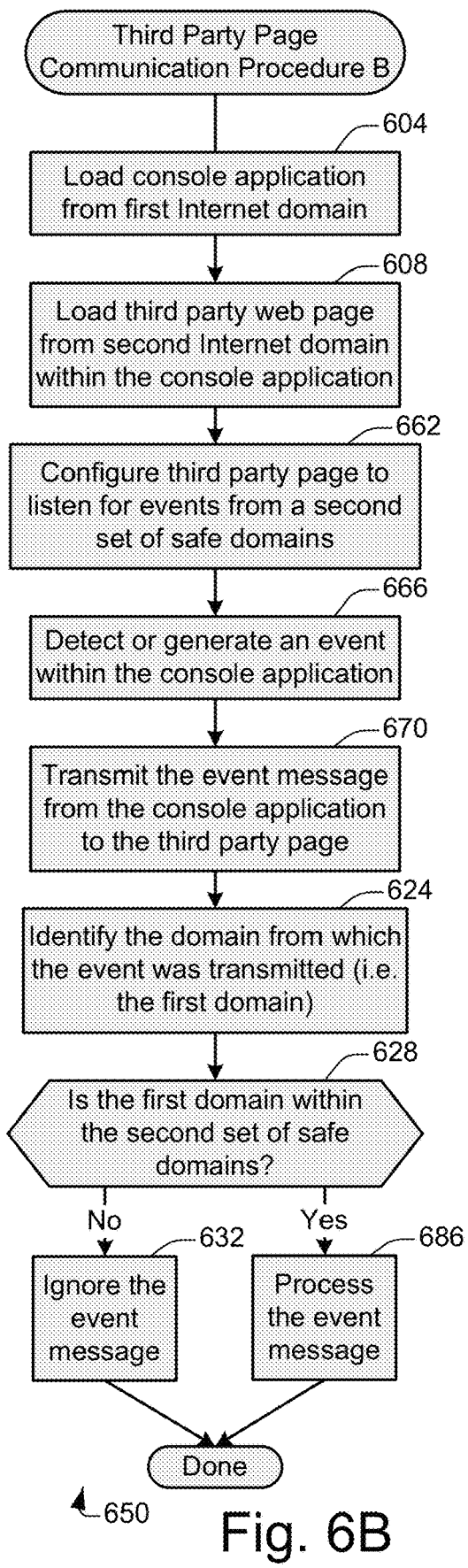
Fig. 6A
Fig. 6B

Hello Sarah, is Tuesday, August 5th okay? Dan Brown and Steve Smith should attend too. I believe case #124 is related to this one. You can reach me at 510-555-5555. Thanks, Mary Lamardo

FIGURE 12A

Hello Sarah, is Tuesday, August 5th okay? Dan Brown and Steve Smith should attend too. I believe case #124 is related to this one. You can reach me at 510-555-5555. Thanks, Mary Lamardo

FIGURE 12B

Some User did Something
Lorem ipsum dolor sit amet, consectetur adipisicing elit, sed do eiusmod tempor incididunt ut labore et dolore magna aliqua. Ut enim ad minim veniam, quis nostrud exercitation.

Some User did Something Else
Duis aute irure dolor in reprehenderit in voluptate velit es — Eiusmod — nulla pariatur.
<more details>
[ Action 1 ] [ Action 2 ]
Excepteur sint occaecat cupidatat.

Some User did Something
Lorem ipsum dolor sit amet, consectetur adipisicing elit, sed do eiusmod tempor incididunt ut labore et dolore magna aliqua. Ut enim ad minim veniam, quis nostrud exercitation.

Some User did Something Else
Duis aute irure dolor in reprehenderit in voluptate velit esse cillum dolore eu fugiat nulla pariatur.
Excepteur sint occaecat cupidatat.

*FIGURE 13*

COMPUTER IMPLEMENTED METHODS AND APPARATUS FOR RESPONDING TO ACTIONABLE TEXT PATTERNS IN A FEED ITEM

PRIORITY DATA

This application claims priority to commonly assigned U.S. Provisional Patent Application No. 61/811,348, filed on Apr. 12, 2013, entitled METHODS AND SYSTEMS FOR RESPONDING TO ACTIONABLE TEXT PATTERNS, by Snyder et al., which is hereby incorporated by reference in its entirety and for all purposes.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

The present disclosure relates generally to on-demand services provided over a data network such as the Internet, and more specifically to a console application for accessing and interacting with information stored in the data network, for instance, in a database.

BACKGROUND

Organizations typically employ many different types of software and computing technologies to meet their computing needs. However, installing and maintaining software on an organization's own computer systems may involve one or more drawbacks. For example, when software must be installed on computer systems within the organization, the installation process often requires significant time commitments, since organization personnel may need to separately access each computer. Once installed, the maintenance of such software typically requires significant additional resources. Each installation of the software may need to be separately monitored, upgraded, and/or maintained. Further, organization personnel may need to protect each installed piece of software against viruses and other malevolent code. Given the difficulties in updating and maintaining software installed on many different computer systems, it is common for software to become outdated. Also, the organization will likely need to ensure that the various software programs installed on each computer system are compatible. Compatibility problems are compounded by frequent upgrading, which may result in different versions of the same software being used at different computer systems in the same organization.

Accordingly, organizations increasingly prefer to use on-demand services accessible via the Internet rather than software installed on in-house computer systems. On-demand services, often termed "cloud computing" services, take advantage of increased network speeds and decreased network latency to provide shared resources, software, and information to computers and other devices upon request. Cloud computing typically involves over-the-Internet provision of dynamically scalable and often virtualized resources. Technological details can be abstracted from the users, who no longer have need for expertise in, or control over, the technology infrastructure "in the cloud" that supports them.

BRIEF DESCRIPTION OF THE DRAWINGS

The included drawings are for illustrative purposes and serve only to provide examples of possible structures and process steps for the disclosed inventive systems and methods for providing services to remote clients. These drawings in no way limit any changes in form and detail that may be made to embodiments by one skilled in the art without departing from the spirit and scope of the disclosure.

FIGS. 6A and 6B show flowcharts of examples of methods illustrating interactions of third party pages with the service cloud console environment, in accordance with one or more implementations.

FIGS. 12A and 12B show examples of a graphical user interface (GUI) displaying textual data containing one or more actionable text patterns, in accordance with one or more implementations.

FIG. 13 shows an example of a GUI including a textbox for composing a feed item including an actionable text pattern, in accordance with one or more implementations.

DETAILED DESCRIPTION

Figure 1:
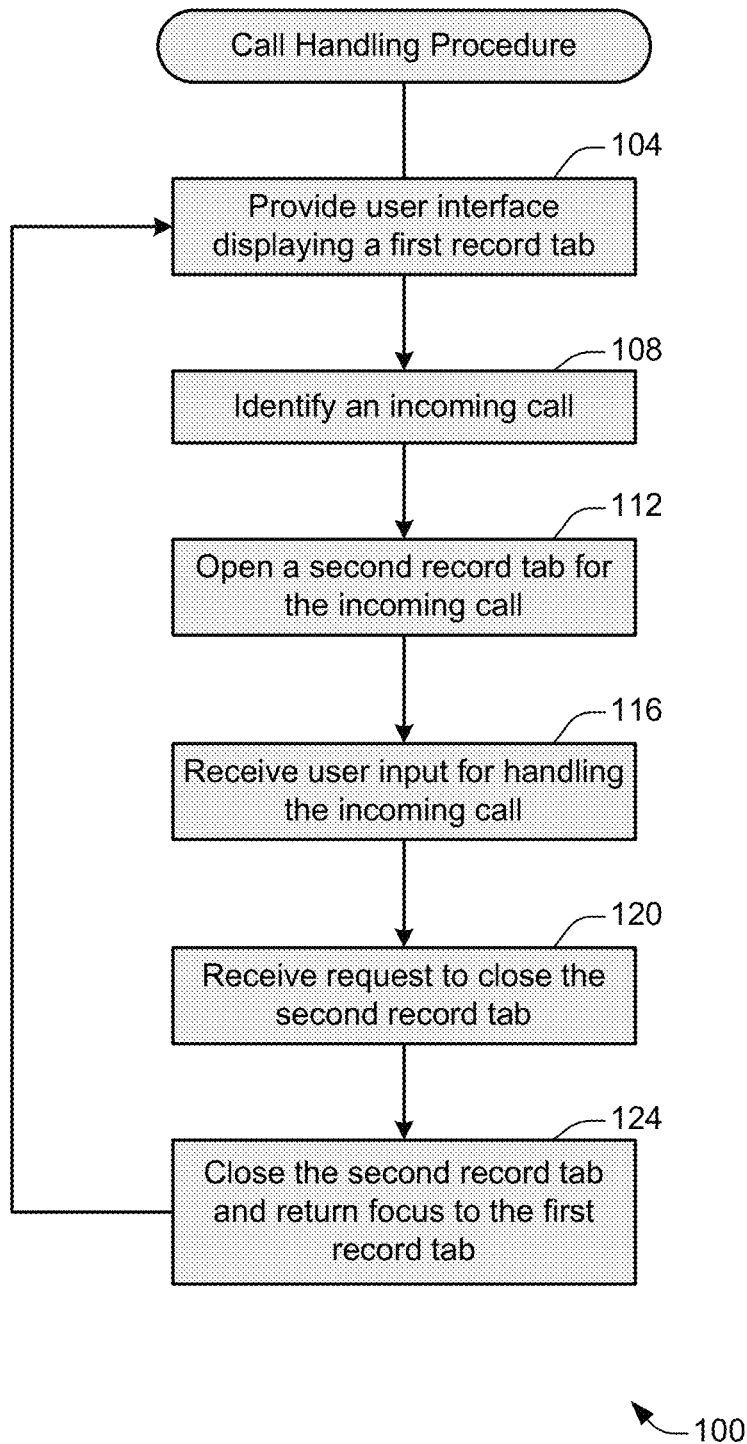
FIG. 1 shows a flowchart of an example of a method 100 for handling a call, performed in accordance with some implementations.

Applications of systems and methods according to one or more implementations are described in this section. These examples are being provided solely to add context and aid in the understanding of the present disclosure. It will thus be apparent to one skilled in the art that the techniques described herein may be practiced without some or all of these specific details. In other instances, well known process steps have not been described in detail in order to avoid unnecessarily obscuring the present disclosure. Other applications are possible, such that the following examples should not be taken as definitive or limiting either in scope or setting.

In the following detailed description, references are made to the accompanying drawings, which form a part of the description and in which are shown, by way of illustration, specific implementations. Although these implementations are described in sufficient detail to enable one skilled in the art to practice the disclosure, it is understood that these examples are not limiting, such that other implementations may be used and changes may be made without departing from the spirit and scope of the disclosure.

As used herein, the term "multi-tenant database system" refers to those systems in which various elements of hardware and software of the database system may be shared by one or more customers. For example, a given application server may simultaneously process requests for a great number of customers, and a given database table may store rows for a potentially much greater number of customers.

Some implementations are directed to a user interface console provided at a client machine for interacting with object record information stored in a multitenant database at a server in an on-demand service environment. Some implementations of the apparatuses, systems and methods disclosed herein are adapted for use in other types of devices, systems or environments, as applicable, such that their use is applicable in broader applications than the environments and contexts described herein.

In the following figures, methods and apparatus applicable to various service cloud console configurations and their associated components are described. In one or more implementations, the service cloud console may be used to provide an on-demand, web-based system for accessing data and applications. The service cloud console (alternately described as the console, the console application, the agent console, or the service desk) includes a user interface provided at a client machine for interacting with object record information stored in storage facilities such as databases at a server.

In one or more implementations, an agent of an organization who is using an instance of a service cloud console application may receive a call from a client who has an account with the organization. Using the service cloud console application, the agent may open, close, edit, and/or save object records associated with the client's account.

Certain components and services of the service cloud console may be used to replace software for accessing data and managing customer records typically installed on separate computers in an organization. For example, the service cloud console may replace one or more CRM programs, call center programs, etc. By using the service cloud console, an agent for an organization can access data associated with a client of the organization.

Use of the service cloud console may be provided over data networks such as the Internet to a plurality of different organizations. The data network in which implementations of the service cloud console is implemented may include other wide area networks ("WAN") and local area networks ("LAN"), or portions thereof. In one or more implementations, different organizations may customize the service cloud console to suit their own needs. For example, an organization may create more than one console application, adjust the settings of a console application, apply a name to a console application, etc.

In one or more implementations, the service cloud console may include one or more graphical user interfaces tailored to maintain the context of an account using a tab metaphor. Examples of selected portions of such a graphical user interface according to one or more implementations are shown FIGS. 7-8. The service cloud console may be componentized such that each tab can display and/or refer to all or selected portions of groups of information. For example, a tab or component in the service cloud console may display all or selected portions of an individual row of data in a database, data integrated from an external system, or any other arrangement of data.

The system may be both easy for agents to use and easy for administrators to manage. One or more implementations may facilitate speed and simplicity, giving the agent the ability to navigate through the interface with a limited number of clicks, and without a great deal of training. One or more implementations may allow the agent to maintain the context, or frame of reference, of a current call and prior calls in an easily navigable interface. One or more implementations may allow the integration of external systems into a single, fluid agent interface. One or more implementations may improve access to a knowledge base, supplying the agent with the information he needs when he needs it.

In one or more implementations, certain components and services of the service cloud console may reduce the number of clicks an agent needed to make to perform a task. An agent's interaction with the console application is made as fast and as fluid as possible. Further, the console application maintains as much context as possible so the agent always knows what he's doing and where he's been in the console application.

In some online social networks, users can access one or more information feeds, which include information updates presented as items or entries in the feed. Such a feed item can include a single information update or a collection of individual information updates. A feed item can include various types of data including character-based data, audio data, image data and/or video data. An information feed can be displayed in a graphical user interface (GUI) on a display device such as the display of a computing device as described below. The information updates can include various social network data from various sources and can be stored in an on-demand database service environment. In some implementations, the disclosed methods, apparatus, systems, and computer-readable storage media may be configured or designed for use in a multi-tenant database environment.

In some implementations, an online social network may allow a user to follow data objects in the form of records such as cases, accounts, or opportunities, in addition to following individual users and groups of users. The "following" of a record stored in a database, as described in greater detail below, allows a user to track the progress of that record. Updates to the record, also referred to herein as changes to the record, are one type of information update that can occur and be noted on an information feed such as a record feed or a news feed of a user subscribed to the record. Examples of record updates include field changes in the record, updates to the status of a record, as well as the creation of the record itself. Some records are publicly accessible, such that any user can follow the record, while other records are private, for which appropriate security clearance/permissions are a prerequisite to a user following the record.

Information updates can include various types of updates, which may or may not be linked with a particular record. For example, information updates can be user-submitted messages or can otherwise be generated in response to user actions or in response to events. Examples of messages include: posts, comments, indications of a user's personal preferences such as "likes" and "dislikes", updates to a user's status, uploaded files, and hyperlinks to social network data or other network data such as various documents and/or web pages on the Internet. Posts can include alphanumeric or other character-based user inputs such as words, phrases, statements, questions, emotional expressions, and/or symbols. Comments generally refer to responses to posts, such as words, phrases, statements, answers, questions, and reactionary emotional expressions and/or symbols. Multimedia data can be included in, linked with, or attached to a post or comment. For example, a post can include textual statements in combination with a JPEG image or animated image. A like or dislike can be submitted in response to a particular post or comment. Examples of uploaded files include presentations, documents, multimedia files, and the like.

Users can follow a record by subscribing to the record, as mentioned above. Users can also follow other entities such as other types of data objects, other users, and groups of users. Feed tracked updates regarding such entities are one type of information update that can be received and included in the user's news feed. Any number of users can follow a particular entity and thus view information updates pertaining to that entity on the users' respective news feeds. In some social networks, users may follow each other by establishing connections with each other, sometimes referred to as "friending" one another. By establishing such a connection, one user may be able to see information generated by, generated about, or otherwise associated with another user. For instance, a first user may be able to see information posted by a second user to the second user's personal social network page. One implementation of such a personal social network page is a user's profile page, for example, in the form of a web page representing the user's profile. In one example, when the first user is following the second user, the first user's news feed can receive a post from the second user submitted to the second user's profile feed, also referred to herein as the user's "wall," which is one example of an information feed displayed on the user's profile page.

In some implementations, an information feed may be specific to a group of users of an online social network. For instance, a group of users may publish a news feed. Members of the group may view and post to this group feed in accordance with a permissions configuration for the feed and the group. Information updates in a group context can also include changes to group status information.

In some implementations, when data such as posts or comments input from one or more users are submitted to an information feed for a particular user, group, object, or other construct within an online social network, an email notification or other type of network communication may be transmitted to all users following the user, group, or object in addition to the inclusion of the data as a feed item in one or more feeds, such as a user's profile feed, a news feed, or a record feed. In some online social networks, the occurrence of such a notification is limited to the first instance of a published input, which may form part of a larger conversation. For instance, a notification may be transmitted for an initial post, but not for comments on the post. In some other implementations, a separate notification is transmitted for each such information update.

In some console applications, a smart text filter recognizes data type patterns in a text field and displays the text of the text field with the actionable elements highlighted in the display. An actionable element may be a data value having a recognizable format, such as a date, a time, a phone number, or an email address. For example, for a date, a calendar event may be created; for a phone number, a call can be made; for an email address, an email may be composed and sent. This functionality may be applied to any computing device operating an application with a text field. In one embodiment, the smart text filter may be used to detect patterns in an incoming feed item of an information feed in a customer relationship management (CRM) environment.

As an example, the input from an email may be: "Hello Sarah, is Tuesday, August 5th okay? Dan Brown and Steve Smith should attend too. I believe case #124 is related to this one. You can reach me at 510-555-5555. Thanks, Mary Lamardo."

A smart text filter may be applied by the server processing this feed item, and the filter may recognize actionable text elements, such as "Dan Brown" and "Tuesday, August 5th", which may be highlighted, underlined, or made distinguishable from the surrounding text in other ways.

The smart text filter may recognize entities (people, cases, companies, organizations) or event-driven data (date, phone number). The entities and the event-driven data may be stored in a database accessible by a server applying the smart text filter to the input text.

An actionable smart text element may be recognized as a uniquely formatted entity ID. Selecting such an element may take the user to a standalone view of that specific entity. A smart text element may also be a date or a non-captured entity, such as an unidentifiable user name, that can produce a link that pops to a creation form representative of the data type. In the case of the date, the creation form may be for a calendar event. In the case of the unidentifiable user name, the creation form may be for a user account. Further, the context of the input may be searched for values that may map to fields of the entity being created. In some implementations, clicking on a date link could result in searching the surrounding context and bringing names and related entities from the context into an event creation form. For example, in the email message example above, clicking on the "Tuesday, August 5th" date link may redirect to a create calendar appointment form for a meeting with the date populated, with the "Dan Brown" and "Steve Smith" as invitees to the meeting, with "case #124" associated with the meeting, and with "510-555-5555" as the dial number for the meeting.

A smart text element may also be a recognizable data value such as phone numbers, email addresses, or twitter handles, which can be links that invoke the channel in which they operate within the context of where they are being acted upon. For example, clicking on a phone number in the context of a browser console application could auto dial the phone number in a CTI softphone. As another example, clicking on a phone number in the context of a mobile phone could auto dial the phone number with the mobile phone. In yet another example, selecting a phone number in an email client may cause a predetermined application, such as Skype, to open to auto dial the phone number. In this way, the action performed in response to selecting the smart text element may depend on the environment.

The smart text filter may be invoked by a user composing a feed item of an information feed. This may be helpful in situations where a smart text filter may not recognize non-unique, organic values such as a name or product category in a text input. In some implementations, the user may at-mention (@mention) an entity or a case to confirm that he is referring to the correct entity or case. Any other prefix may be designated to invoke the smart text filter. Invoking the filter may cause one or more entity names to be displayed in the user interface for the user to select.

In another example, when the user uses an invoke character, such as "@" to invoke the smart text filter on a term, the invoke character may be removed from the text once the smart text filter is applied and the text is highlighted. For example, if a user types "@Case 001" to invoke the smart text filter, the output may be a highlighted "Case 001".

The smart text links may be displayed in a feed or entity detail page as blue hypertext links. Alternatively, a more muted treatment to the smart text links may be used, in which the smart text values may be more prominent on hover. Additionally, it may be useful to present more information on an actionable element without having to open the full entity view. This may be accomplished through a hover bubble, where the information appears in a bubble that appears when the user hovers the mouse pointer over the smart text link. In another implementation, this may be accomplished by displaying a bubble with the information when the user clicks on the smart text link.

In this way, a feed item with smart text elements may provide additional information to a user viewing the feed item and may provide the user with multiple ways to perform actions on the entities and values represented by the smart text elements. If a user writes an internal note with user names, a phone number, and a date, which are labeled as actionable elements, the user can easily extract these fields to create a calendar appointment. This may also provide quick access to accounts that are mentioned in an internal note or an email of an on-demand service environment.

As another example, a published feed item may include a poll that includes a plea such as "please choose", and a list of options, each option prefixed with a character like a dash. A user could create a poll in a feed item by entering the poll in this format, such that the published feed item is displayed as a poll with the prompt and selectable options.

While the disclosed implementations are often described with reference to examples of a case, those skilled in the art should appreciate that a case is one of many examples of database records. The disclosed techniques are equally applicable to other various types of records, files, objects and other data constructs that may be stored in a database or other suitable storage medium. For example, CRM objects such as leads, accounts, opportunities, contracts, and contacts may be substituted for case records in the examples disclosed herein.

User Interface Overview

Figure 7:
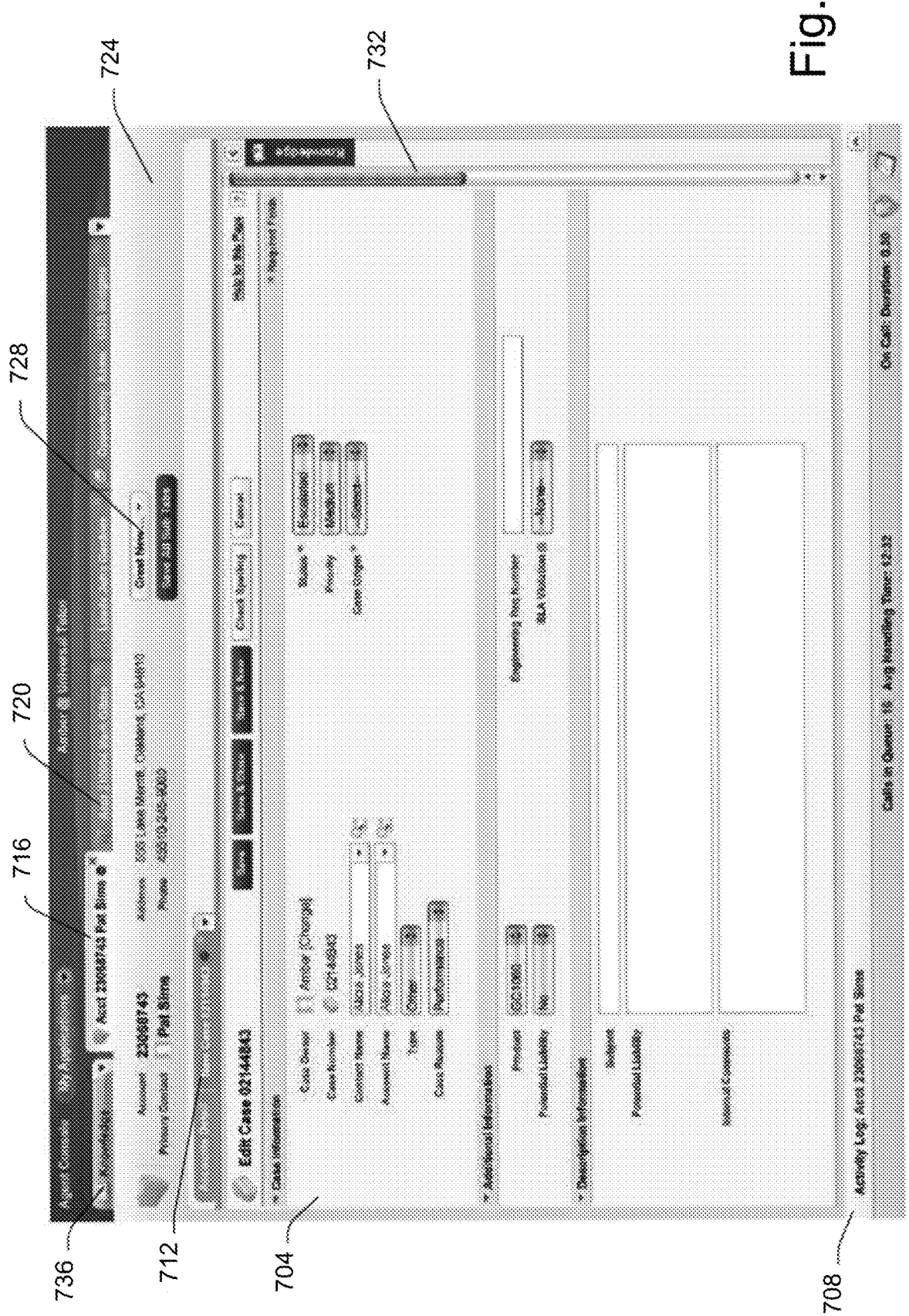
FIGS. 7 and 8 show images of examples of user interfaces that may be presented in a web browser at a client machine, in accordance with one or more implementations.
Figure 8:
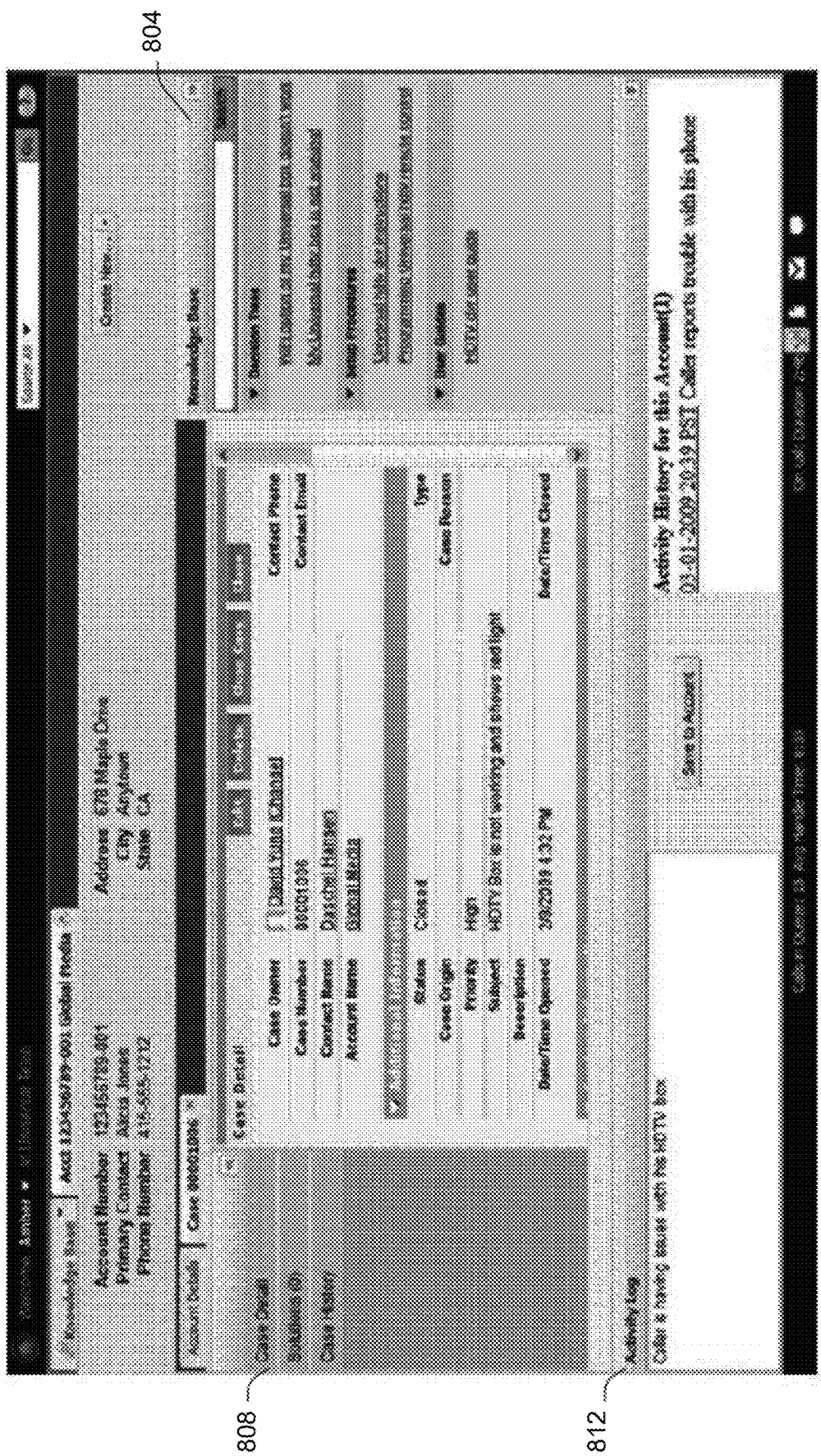

FIGS. 7 and 8 show images of examples of user interfaces that may be presented in a web browser at a client machine, in accordance with one or more implementations. Different implementations may include various user interfaces. For example, the user interface shown in FIG. 8 has a different appearance than the user interface shown in FIG. 7. Thus, the claims should not be construed as being limited to any particular user interface(s).

In one or more implementations, the user interface of the service cloud console may include one or more of an overview area, a main view area 704, a context view area 804, a sidebar area 808, a marquee area 708, and/or a highlights panel 724. The overview area may be a container in which components associated with the service cloud console, such as components 704, 708, 712, 716, 720, 724, 728, 732, and 736, are displayed. The overview area may show components that span a large set of information (e.g., a list view).

The main view 704 may show the detail or edit page of a single object or a search results page. The context view 804 may show small but editable views of objects that are related to the object in the main view. The sidebar 808 may be positioned on the side of the screen and may include an ability to handle a wide range of components. The marquee 708 may display a limited amount (e.g., one line) of informational text.

In some implementations, the main view 704 may display various information associated with one or more object records that are currently open as a primary tab (alternately referred to as a workspace) in the console application. The main view 704 may display one or more secondary tabs 712 that are each associated with the primary tab 716 that has focus in the console application. When a different primary tab (e.g., primary tab 720) is selected, then the one or more secondary tabs associated with the different primary tab may be displayed. The main view 704 may include a UI tool such as a vertical and/or horizontal scroll bar 732 to navigate the displayed page.

In one or more implementations, the main view 704 may rarely be overridden. For instance, search results and list views shown in the main view 704 may open new tabs rather than overriding the content of the main view 704 so that when the user navigates to an object, the results of the search are not lost. Similarly, sub-operations like creating tasks or sending emails may not override the content of the main view 704, but may use a technique such as an HTML <div> overlay to maintain context. The main view 704 may support inline editing.

The highlights panel 724 may include an area in the workspace (e.g., at the top) which gives the user information about the object controlling that workspace. A "mutton" 728 may be displayed in the highlights panel 724. The mutton 728 (alternately referred to as a multi-button) may be a button that acts as a dropdown menu containing multiple functions. The mutton 728 may allow the agent to perform actions that would normally be performed from buttons on related lists of the layout. The mutton 728 may include various buttons, which can be shown, for example, if the entity happens to be in a related list on the layout of the workspace entity, and if the button is shown in the layout for that related list.

One or more implementations may include a sidebar 808 that may be displayed on the side of the interface, as shown in FIG. 8. The sidebar 808 may be a separate layout such that there is a specific console sidebar component that is rendered in the console. The setup of the sidebar layout may be available in the console layout and may use concepts similar to that used for home page layouts.

In one or more implementations, when displaying a record in the main view area, the sidebar 808 may display one or more related lists, as shown in FIG. 8. The items displayed in the sidebar 808 may be navigated by a UI tool such as a vertical scroll bar if the number of items exceeds the vertical space. In certain situations, such as when a record is being edited, the sidebar 808 may be hidden.

The sidebar 808 may allow handling of various types of components, so it may include an interface (e.g., a tab or accordion widget) to manage these components effectively (e.g., displaying them without sending them below the fold of the page). The sidebar 808 may include a pluggable interface that has knowledge of the current context of the main page so that third parties can create custom sidebar components.

The marquee 708 may be a short area (e.g., one character high) that may be shown at the top and/or bottom of the screen. The marquee 708 may show fixed text and/or scrolling text. The direction of the scrolling text may depend on the agent's preferred language (e.g., right to left for user languages like English that are left-to-right, and left to right for languages like Hebrew that are right-to-left). The API may include a message object as a container for marquee messages. Message rows may count towards storage (e.g., in the database).

One or more implementations may include a control 736 referred to as a navigation tab (alternately referred to herein as Silvertab) which provides agents access to various objects without leaving the console. The navigation tab 736 can be configured by the administrator (alternately referred to as an admin) to access various available objects. In some implementations, only objects designated as navigation tab items for the console will be listed in the navigation tab menu. A default item can be selected from the chosen navigation tab items. On initial view of the console, the end user may see the navigation tab 736 in the top left region of the console with the default item name, color, and/or icon. In some implementations, the navigation tab 736 provides an approximately 150px width space for icon and text. An item label that exceeds the available width (e.g., 150px) may be truncated and appended with an ellipsis. In other implementations, the width space of the navigation tab may be a different size.

In some implementations, the overview area may display general overview information. The general overview information may be displayed using one or more list views, dashboards, or custom components. One or more implementations may include an activity log 1212 for entering information related to changes to the record, as shown in FIG. 8.

List views may include various capabilities, such as inline editing. When an object is clicked in the list view, it may raise an event that opens one or more tabs that pertain to that object. One or more list views may auto-update. For example, the list view may be configurable to auto-refresh at an interval (e.g., 5 minutes). One or more list views may be multi-sortable (e.g., an agent may be able to select multiple columns by which to sort). One or more list views may include hovers, a preview icon that can be clicked to show a hover, or both. One or more list views may include one or more visual indicators (e.g., indicating whether a new comment, email, or escalation has been added to a case). One or more list views may include a provision for mass actions.

One type of list view may be a universal inbox, which may contain a list of actionable items. This list may include (but is not limited to) new cases, leads, case comments, emails, tasks, and pending events. One advantage of the universal inbox is that it can show many different types of objects in one place and may allow users to prioritize them.

In one or more implementations, the overview area may be populable by draggable dashboard components. The overview area may be able to contain one or more of list views and/or dashboard components at the same time. A dashboard that is visible to a user may be available as a dashboard component.

In some implementations, one or more of these views may be collapsible. Collapsible views allow views to be hidden if the agent does not desire them there. The size of each of the views may be saved across sessions on a per-agent basis so that the agent does not have to re-layout his console every time he navigates to it.

The URL format of the service cloud console may be regular and/or bookmarkable. For instance, if an agent is viewing a case detail page, the agent may be able to copy that URL from the browser and email it to a colleague. When the colleague clicks on that URL, the corresponding case should appear in the main view of the colleague's console (even if the colleague's console is otherwise laid out differently).

FIG. 1 shows a flowchart of an example of a method 100 for handling a call, performed in accordance with some implementations. The call handling method 100 may be performed to facilitate the handling of a call by an agent using the service cloud console. For example, the call handling method 100 may be performed at a client machine in communication with a server. The client machine may be running a web browser displaying a user interface representing an instance of the service cloud console, such as the user interfaces shown in FIGS. 7 and 8.

In some implementations, one or more of the operations shown in FIG. 1 may be completed without refreshing the user interface or web page displayed in the web browser at the client machine in which the user interface is shown. Completing operations without refreshing the web page may allow the agent to receive calls and to open, edit, save, and close object records without significant interruptions.

At 104, a first record tab for accessing a first object record is provided. In one or more implementations, the first object record tab is provided in the user interface displayed in the web browser running at the client machine. An example of such a tab is shown at 716 in FIG. 7. The first object record tab may display information associated with the first object record. The first object record may be, for example, a database object stored in a database on the server.

For example, the first object record may be a client account, or a portion of a client account, such as the account shown on tab 716 in FIG. 7. The first object record tab may then contain information related to the client account, such as one or more names, phone numbers, e-mail addresses, or other contact information. Additionally, or alternatively, the first object record tab may contain information such as billing data, technical data, client preferences, or any other type of information associated with the first object record in the database such as the case information shown in the main view 704 in FIG. 7.

Although one or more implementations display object records as tabs as user interface components, the user interface components for displaying object records are not limited to being displayed in tabs. According to various implementations, different types of user interface components may be used, such as window panes, windows, ribbons, 3D navigation environments, etc.

At 108, an incoming call is identified. The call may include any communication from an individual. In some instances, the call may be a communication from an individual associated with an account accessible via the service cloud console. For example, the call may be a communication from an individual associated with a customer of the organization using the service cloud console application.

In one or more implementations, the incoming call may be a voice call. The voice call may be a telephone call transmitted over a telephone network such as the public switched telephone network (PTSN), a voice over IP (VOIP) call received over a computer network, a pre-recorded voice call, or any other type of voice call. In some implementations, the incoming call may be another type of call, such as a text chat session, an e-mail, a text message, or any other type of communication.

In some implementations, identifying the incoming call may include identifying a number from which the call originated (e.g., a PSTN number, a VOIP number, etc.). Alternately, identifying the incoming call may include identifying a chat handle, a customer identification number, a URL, an e-mail address, or any other relevant identifier. However, in some instances the source of the incoming call may not be identified.

In one or more implementations, identifying the incoming call may include identifying an account associated with the incoming call. For example, a database at the server may be queried using a number associated with the incoming call to identify an account associated with the incoming call. In this case, the user interface may display information associated with the incoming call, such as the name of a client making the call, the name of an account associated with the client, or other information.

In one or more implementations, the incoming call may be received by the agent. For example, the incoming call may be received within the user interface displayed in the web browser by opening or activating a user interface component associated with receiving a call.

As a different example, the incoming call may be received via a different program or web page at the client machine. For example, the client machine may have dedicated software for receiving calls. Alternately, a separate user interface for receiving calls via a web browser may be displayed in a different tab or window of the web browser.

As yet another example, the incoming call may be received via a device other than the client machine, such as a telephone or headset. The telephone or headset may be communicatively coupled with one or both of the client machine or the server.

At 112, a second record tab for the incoming call is opened. When the second record tab is opened, the first record tab may be hidden from view. One method for opening a record is discussed with reference to FIG. 2.

In one or more implementations, a tab ordering including a listing of one or more previously accessed record tabs may be stored at the client machine. In this way, the focus of the user interface may be automatically returned to the previous record tab (e.g., the first record tab) when a subsequently accessed record tab (e.g., the second record tab) is closed.

In one or more implementations, the second record tab may be opened automatically. For example, when the incoming call is identified, a query may be transmitted to a database at the server to identify an object record associated with the incoming call. When the record is identified, the second record tab may then be opened automatically opened. Opening the second record tab automatically may save time for the agent because the agent need not manually look up the client's account. Instead, the client's account may already be open so that the agent has access to the account information when handling the call.

Alternately, the second record tab may be opened manually (e.g., by the agent). For example, the agent may identify a record to open after receiving the call and receiving information from the client. Manually opening the second record tab may be necessary if, for example, the client is calling from an unidentified source or a source not yet associated with the client's account. In this case, the agent may receive information from the client and then provide input to the user interface causing the identified object record to open.

In some instances, the second record tab may be associated with a new or blank object record. For example, the client may not be associated with an existing account, as may be the case for a new client. As another example, the client may be establishing a new record associated with an existing account.

At 116, user input for handling the incoming call is received. The user input may include any information for handling the incoming call, such as modifying account information for the client's account, adding new account information, establishing a new account for the client, deleting existing account information, updating or entering account preferences, etc.

In some instances, one or more additional procedures may be triggered during or after the receipt of the user input. For example, one or more instances of a contextual sidebar update method and/or an edited page detection method may be triggered. Examples of these methods are discussed with reference to FIGS. 5 and 6.

At 120, a request is received to close the second record tab. The request to close the second record tab may be received by detecting a click of a close button on a primary tab, such as the primary tab 116 shown in FIG. 7. In some instances, the received request may be an explicit request to close the second record tab. For example, the received request may be the detection of user input in the user interface such as clicking a "close" button or symbol, the detection of a keyboard command that corresponds with a request to close the tab, or any other technique for receiving an explicit request to close the second record tab.

In some instances, the received request may be an implicit request to close the second record tab. For example, the termination of the call may in some instances trigger a request to close the second record tab.

Figure 4:
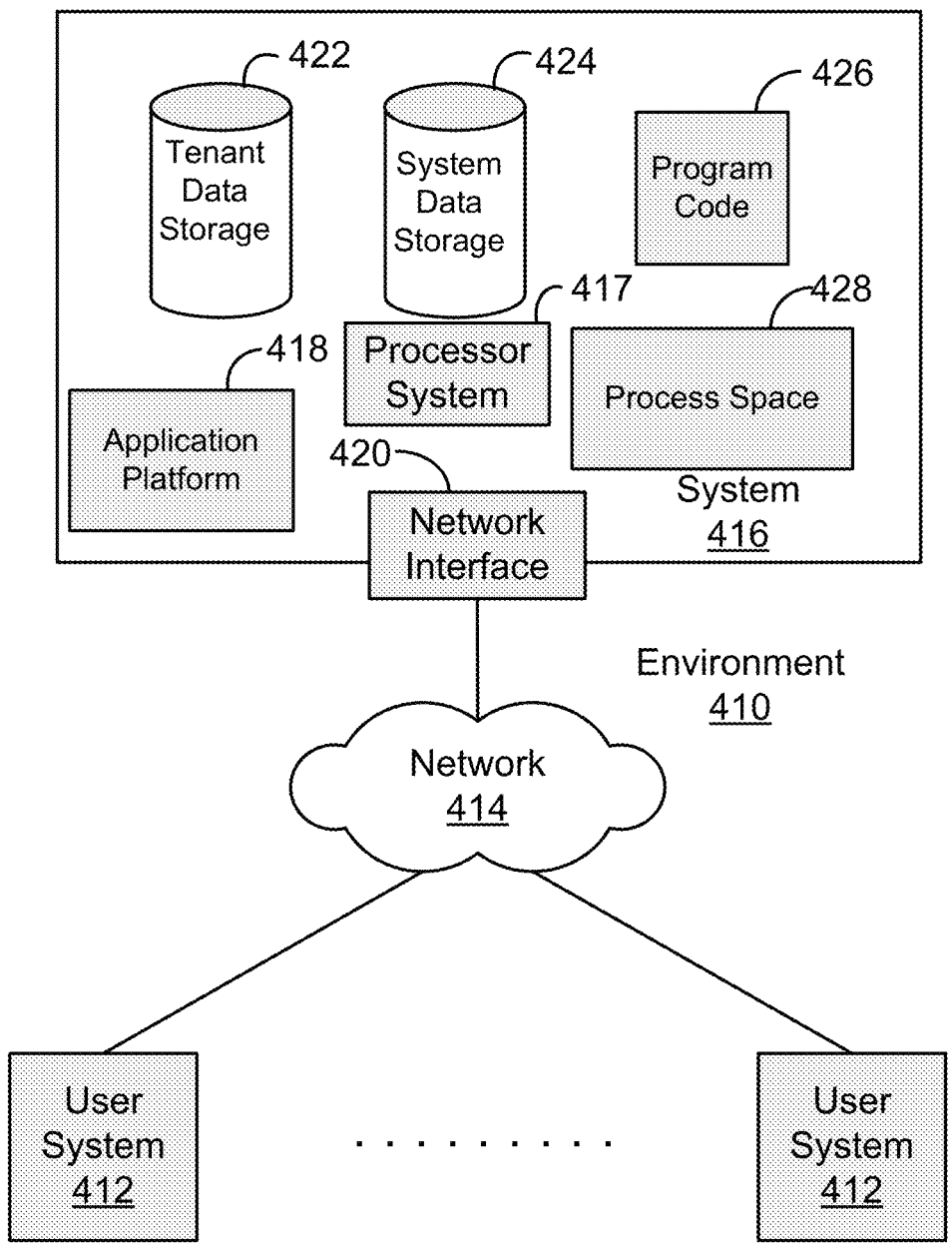
FIG. 4 shows a system diagram illustrating an example of the architecture of a multitenant database environment, in accordance with some implementations.

In one or more implementations, receiving a request to close the second record tab may trigger one or more procedures associated with ensuring that edited data is saved to the server, such as the edited page save method shown in FIG. 4.

At 124, the second record tab is closed. When the second record tab is closed, the second record tab may be removed from the user interface. Further, the first record tab may be revealed to the agent. Revealing the first record tab when the second record tab is closed may allow the agent to quickly resume interacting with the first record tab, thus reducing the interruption caused by receiving the call.

Figure 2:
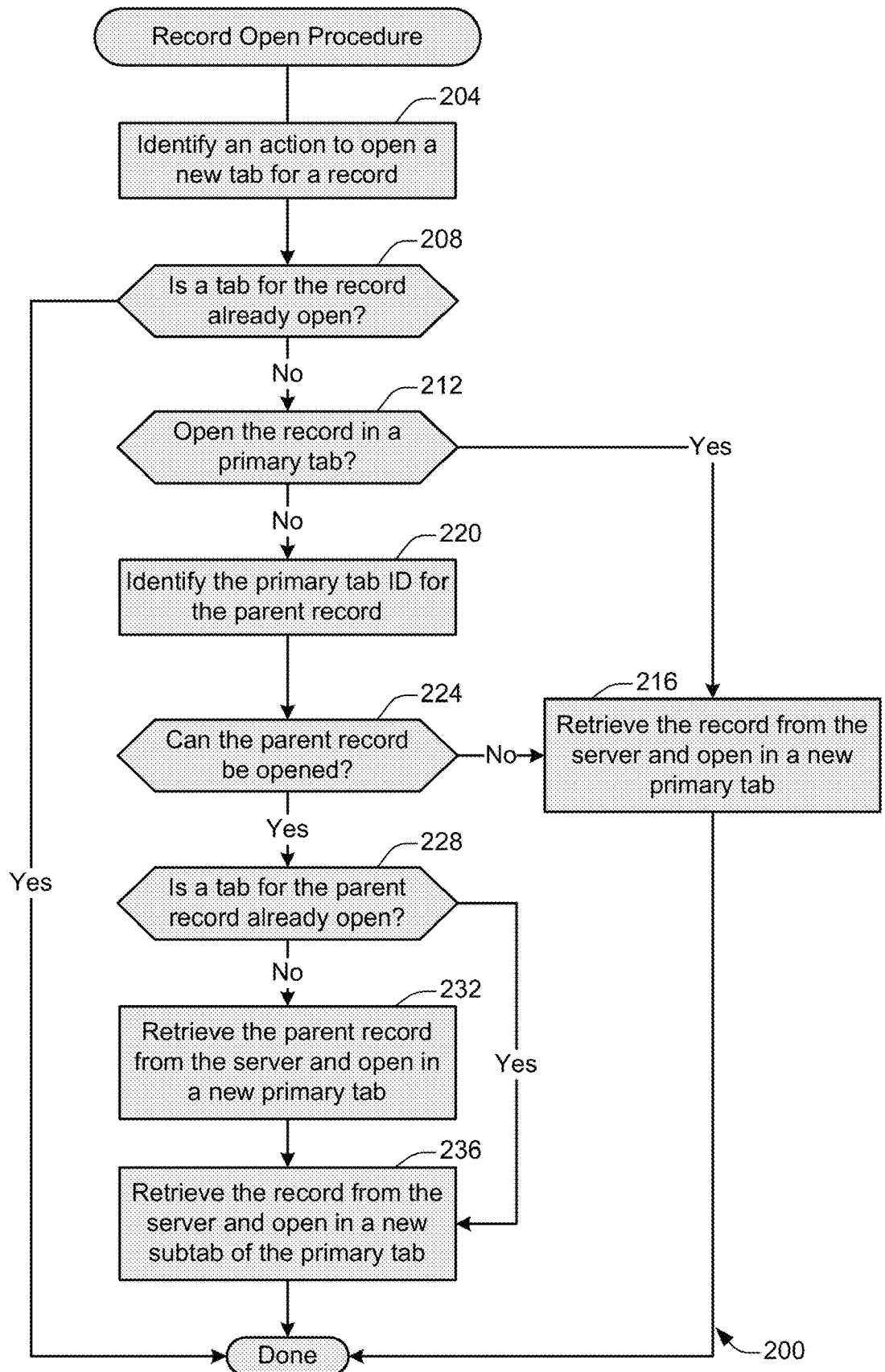
FIG. 2 shows a flowchart of an example of a method 200 for opening a record, performed in accordance with some implementations.

FIG. 2 shows a flowchart of an example of a method 200 for opening a record, performed in accordance with some implementations. The record open method 200 may be performed when the service cloud console user interface is displayed in a web browser at a client machine. The service cloud console interface may be open in a browser tab of a web browser or may be the only page open in the browser.

In one or more implementations, the service cloud console may display one or more user interface components for displaying object record information associated with object records stored in a database. Object records may include any database objects accessible via the service cloud console. In some implementations, these user interfaces may be arranged according to a tab metaphor, as is illustrated in the user interfaces shown in FIGS. 7-8. One or more implementations may use one or more different types of user interface components, such as windows, window panes, pages, wizard guides, list boxes, tree controls, etc. For example, one or more implementations may employ a "wizard-style" interface in which an agent is led through one or more tasks (e.g., using arrows). However, records are described herein as being displayed within tabs.

In one or more implementations, the service cloud console may display one or more primary tabs (alternately referred to as workspace tabs). As is shown in FIGS. 7 and 8, primary tabs may be arranged in a drag-and-drop user interface. The graphical user interface 700 shown in FIG. 7 includes a navigation tab 736 and primary tabs 716 and 720. The graphical user interface 700 also includes a highlights panel 724, a mutton 728, and an activity log 708. The record opened in the primary tab is displayed in the main view 704, and in FIG. 8, the graphical user interface 800 also includes a sidebar 808.

In one or more implementations, an individual primary tab may be closed using a close button. When an individual tab is closed, the last-viewed primary tab or the navigation tab may be brought into focus.

The graphical user interface shown in FIG. 7 includes a subtab bar 712. In one or more implementations, items or records other than the primary tab object opened within a primary tab may be displayed as subtabs in subtab bar 712. As with primary tabs, subtabs may be rearranged via a drag-and-drop interface, as shown in FIG. 7. However, one or more subtabs may be arranged in a fixed position. For example, the account detail page associated with the primary tab record may be fixed as the first subtab in the subtab bar 712, as shown in FIG. 7.

The operations shown in FIG. 2 illustrate a method for opening a record tab according to one or more implementations. The service cloud console may be operable to open and/or close record tabs without refreshing the web page in which the service cloud console user interface is displayed. Thus, an agent may open and/or close record tabs, which may include communications between the client machine and the server, without interrupting the user of the service cloud console.

At 204, an action to open a new tab for a record is identified. In some instances, the identified action may include an action taken by a user with the intention of opening a new record. For example, the identified action may be a mouse click or keyboard press indicating that a record should be open. In other instances, the identified action may include a condition or result that occurs in one or more processes. For example, a record may be automatically opened when a call is received.

In one or more implementations, the action to open a new tab may be identified in various ways. In some instances the action may be identified by determining user input using one or more client-side web technologies, such as HTML or JavaScript®, to detect user interaction with the user interface. In some instances, the action may be identified by receiving a message from the server (e.g., an HTTP message, an Ajax message, etc.). For example, the server may send a message to the browser indicating that a call is being routed to the client machine.

In some implementations, identifying the action to open a new tab for a record may include identifying the record itself. In some instances, an identifier for the record may be determined when the action is detected. For example, the identifier may be included in a link clicked by a user. In other instances, an identifier for the record may be determined based on cached information at the client and/or communication with the server.

At 208, a determination is made as to whether the record tab is already open. In some implementations, the determination may be made based on information at the client machine. For example, a list of open tabs may be maintained at the client machine, and an identifier associated with the identified record may be compared against that list.

In some implementations, the determination as to whether the record tab is already open may be made in cooperation with the server. For example, the server may query a database to determine an identifier associated with the record. As another example, the server may maintain a list of records opened at the client machine. The server may then return to the client an indication as to whether the record tab is already open.

At 212, a determination is made as to whether to open the record in a primary tab. In one or more implementations, a record (e.g., a database row) may be either a primary object (e.g., a workspace object) or a secondary object. For example, a customer account may be treated as a primary object, while a case may be treated as a secondary object.

The determination as to whether to open the record in a primary tab may be based upon whether the record represents a primary or workspaceable object (e.g., an account), or a secondary object associated with a primary object (e.g., a case associated with an account). When record is associated with a workspace object, the record may be termed a "child" of the workspace "parent" object.

If the record is a workspace object, such as a customer account, then the record may open in a primary tab. If instead the record is a secondary object that is associated with a workspace object, such as a case that is associated with a customer account, then the record may open in a secondary tab.

If the record is a secondary object that is not associated with a workspace object, such as a case for which an account has not yet been opened, then the record may open in a primary tab. If the record is a custom object that does not have an assigned category or association, then the record may open as a primary tab. If a custom record or other secondary object is opened in a primary tab, then the record's own highlight's panel layout may be used to display a highlights panel for the workspace.

In some implementations, the determination 212 may be made at the client machine. For example, the client machine may maintain information indicating certain record types that should open as primary or secondary tabs. In one or more implementations, the determination 212 may be made in conjunction with communication with the server. For example, the client machine may transmit to the server a record type and/or record identifier associated with the record. The server may then conduct a database query and then return an indication as to whether to load the record in a primary or secondary tab.

At 220, the primary tab ID for the parent record is identified. In some instances, the primary tab ID may be identified at the server, for example by querying a database after the record has been identified by the client machine. In other instances, the primary tab ID may be identified at the client machine, for example by consulting cached tab information stored at the client machine.

At 216, the record is retrieved from the server and opened in a new primary tab. Retrieving the record may involve one or more database queries to collect data and/or layout information for display in some or all of the user interface components that may be associated with a tab, including main view information, contextual information, overview panel information, etc. Since the record is opened as a primary tab, highlights panel information may also be retrieved.

The retrieved information is then transmitted from the server to the client machine. When the retrieved record information is received at the client machine, the client machine opens the record in a new primary tab. The client machine may change focus to the new tab in the user interface once the new tab is open. However, the context is maintained so that other tabs that were previously open may be selected.

At 224, a determination is made as to whether the parent record can be opened. The parent record may not be available for opening if, for example, the user lacks permission to open the parent record, the parent record does not exist, the parent record is invalid, etc. If the parent record is not available for opening, then the parent record may be opened in a new primary tab, as shown at 216.

In some instances, the determination as to whether the parent record can be opened may be made on the client machine. For example, if the primary tab ID for the parent record is null or otherwise invalid, then the client machine may determine that the parent record may not be opened without communicating with the server.

In some instances, the determination as to whether the parent record can be opened may be made on the server. For example, the server may determine whether the user has permission to open the parent record by comparing one or more permissions associated with the user's profile to one or more permissions required to open the parent record.

At 228, a determination is made as to whether the parent record tab is already open. In some implementations, the determination may be made based on information at the client machine. For example, a list of open tabs may be maintained at the client machine, and an identifier associated with the parent record may be compared against that list.

In some implementations, the determination as to whether the record tab is already open may be made in cooperation with the server. For example, the server may maintain a list of records opened at the client machine. The server may then return to the client an indication as to whether the parent record tab is already open.

At 232, the parent record is retrieved from the server and opened as a primary tab. Retrieving the parent record may involve one or more database queries to collect data and/or layout information for display in some or all of the user interface components that may be associated with a tab, including main view information, contextual information, overview panel information, etc. Since the parent record is opened as a primary tab, highlights panel information may also be retrieved.

The retrieved record information is then transmitted from the server to the client machine. When the retrieved record information is received at the client machine, the client machine opens the parent record in a new primary tab. The client machine may change focus to the new tab in the user interface once the new tab is open. However, the context is maintained so that other tabs that were previously open may be selected.

At 236, the record is retrieved from the server and opened in a new subtab of the primary tab. Retrieving the record may involve one or more database queries to collect data and/or layout information for display in some or all of the user interface components that may be associated with a tab, including main view information, contextual information, overview panel information, etc.

The retrieved record information is then transmitted from the server to the client machine. When the retrieved record information is received at the client machine, the client machine opens the record in a new subtab of the primary tab. The client machine may change focus to the new subtab in the user interface once the new subtab tab is open. However, the context is maintained so that other tabs that were previously open may be selected.

In one or more implementations, a record tab may include a tab label. A tab label may include information associated with the page, such as the name and/or type of page being opened. For example, an account record called Acme Systems may open with a tab labeled "Account: Acme Systems." As another example, tabs for external pages may be labeled as "External Page," since page titles currently may not be retrieved from HTML iframes. In some implementations, the tab label of a tab may change when the tab or a subtab changes (e.g., when a page is moved from detail mode to edit mode).

In one or more implementations, tab labels that exceed the tab size may be truncated. For example, excess characters may be replaced by an ellipsis. In some implementations, tabs may be dynamically resized according to the number of tabs in existence.

In one or more implementations, one or more of the operations shown in FIG. 2 may be performed at the client machine, at the server, or using a client/server combination. Where an operation is performed may be based on where information is located. For example, the client machine may maintain cached information that allows the client machine to perform one or more operations without communicating with the server. However, cached information may in some instances be insufficient to perform an operation without server interaction.

In some implementations, one or more of the operations shown in FIG. 2 may be performed in a different order than is shown. For example, two or more operations that involve communication between the client machine and server may be combined into fewer operations in order to reduce the burden on the server and/or reduce client-side delays caused by communicating with the server. For example, operations 212 and 216 may be combined into a single client-server interaction in some instances.

Figure 3A:
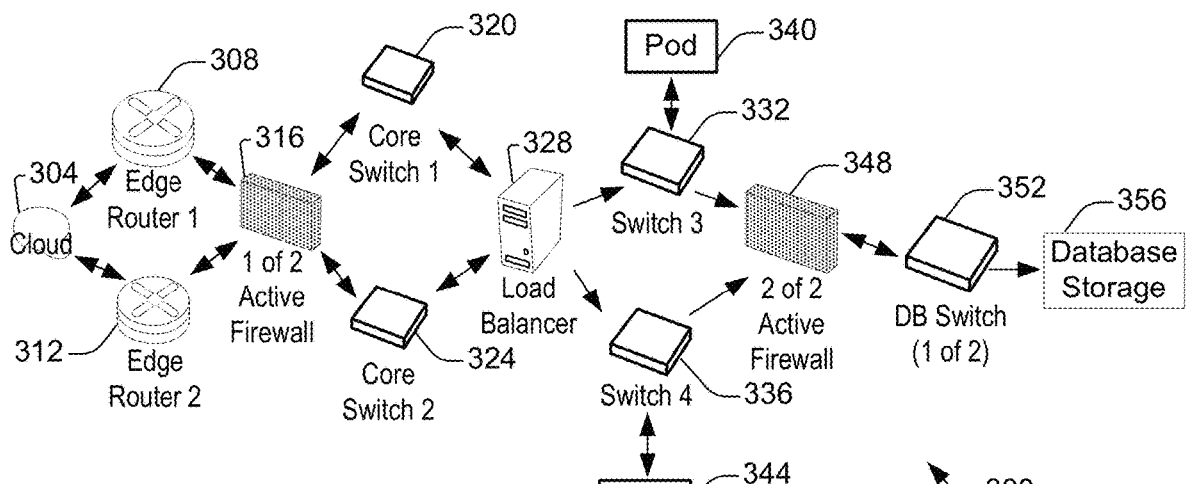
FIG. 3A shows a system diagram of an example of architectural components of an on-demand service environment, in accordance with some implementations.

FIG. 3A shows a system diagram of an example of architectural components of an on-demand service environment, in accordance with some implementations.

A client machine located in the cloud 304 (or Internet) may communicate with the on-demand service environment via one or more edge routers 308 and 312. The edge routers may communicate with one or more core switches 320 and 324 via firewall 316. The core switches may communicate with a load balancer 328, which may distribute server load over different pods, such as the pods 340 and 344. The pods 340 and 344, which may each include one or more servers and/or other computing resources, may perform data processing and other operations used to provide on-demand services. Communication with the pods may be conducted via pod switches 332 and 336. Components of the on-demand service environment may communicate with a database storage system 356 via a database firewall 348 and a database switch 352.

Figure 3B:
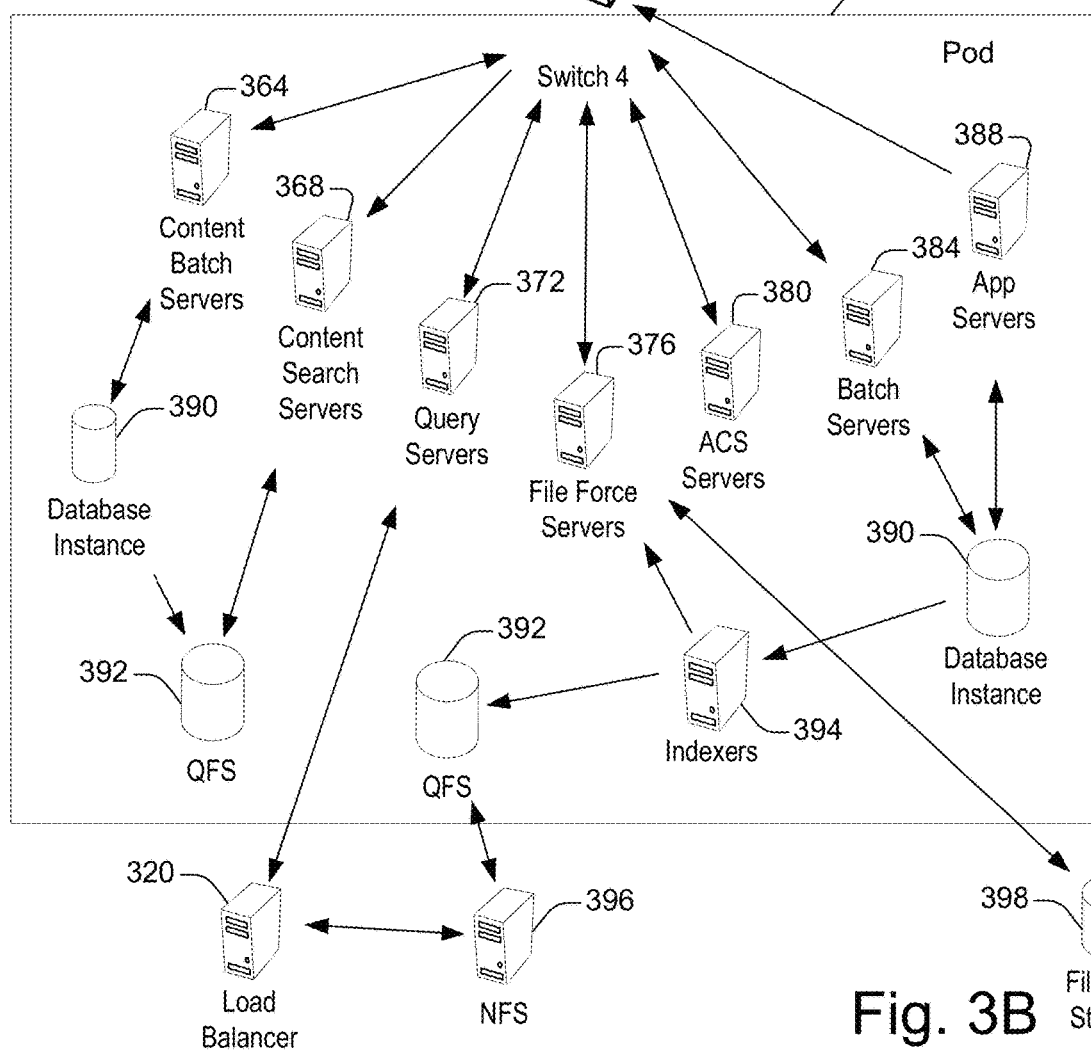
FIG. 3B shows a system diagram further illustrating an example of architectural components of an on-demand service environment, in accordance with some implementations.

As shown in FIGS. 3A and 3B, accessing an on-demand service environment may involve communications transmitted among a variety of different hardware and/or software components. Further, the on-demand service environment 300 is a simplified representation of an actual on-demand service environment. For example, while only one or two devices of each type are shown in FIGS. 3A and 3B, some implementations of an on-demand service environment may include anywhere from one to many devices of each type. Also, the on-demand service environment need not include each device shown in FIGS. 3A and 3B, or may include additional devices not shown in FIGS. 3A and 3B.

Moreover, one or more of the devices in the on-demand service environment 300 may be implemented on the same physical device or on different hardware. Some devices may be implemented using hardware or a combination of hardware and software. Thus, terms such as "data processing apparatus," "machine," "server", "computing device" and "device" as used herein are not limited to a single hardware device, but rather include any hardware and software configured to provide the described functionality.

The cloud 304 is intended to refer to a data network or plurality of data networks, often including the Internet. Client machines located in the cloud 304 may communicate with the on-demand service environment to access services provided by the on-demand service environment. For example, client machines may access the on-demand service environment to retrieve, store, edit, and/or process information.

In some implementations, the edge routers 308 and 312 route packets between the cloud 304 and other components of the on-demand service environment 300. The edge routers 308 and 312 may employ the Border Gateway Protocol (BGP). The BGP is the core routing protocol of the Internet. The edge routers 308 and 312 may maintain a table of IP networks or 'prefixes' which designate network reachability among autonomous systems on the Internet.

In one or more implementations, the firewall 316 may protect the inner components of the on-demand service environment 300 from Internet traffic. The firewall 316 may block, permit, or deny access to the inner components of the on-demand service environment 300 based upon a set of rules and other criteria. The firewall 316 may act as one or more of a packet filter, an application gateway, a stateful filter, a proxy server, or any other type of firewall.

In some implementations, the core switches 320 and 324 are high-capacity switches that transfer packets within the on-demand service environment 300. The core switches 320 and 324 may be configured as network bridges that quickly route data between different components within the on-demand service environment. In some implementations, the use of two or more core switches 320 and 324 may provide redundancy and/or reduced latency.

In some implementations, the pods 340 and 344 may perform the core data processing and service functions provided by the on-demand service environment. Each pod may include various types of hardware and/or software computing resources. An example of the pod architecture is discussed in greater detail with reference to FIG. 3B.

In some implementations, communication between the pods 340 and 344 may be conducted via the pod switches 332 and 336. The pod switches 332 and 336 may facilitate communication between the pods 340 and 344 and client machines located in the cloud 304, for example via core switches 320 and 324. Also, the pod switches 332 and 336 may facilitate communication between the pods 340 and 344 and the database storage 356.

In some implementations, the load balancer 328 may distribute workload between the pods 340 and 344. Balancing the on-demand service requests between the pods may assist in improving the use of resources, increasing throughput, reducing response times, and/or reducing overhead. The load balancer 328 may include multilayer switches to analyze and forward traffic.

In some implementations, access to the database storage 356 may be guarded by a database firewall 348. The database firewall 348 may act as a computer application firewall operating at the database application layer of a protocol stack. The database firewall 348 may protect the database storage 356 from application attacks such as structure query language (SQL) injection, database rootkits, and unauthorized information disclosure.

In some implementations, the database firewall 348 may include a host using one or more forms of reverse proxy services to proxy traffic before passing it to a gateway router. The database firewall 348 may inspect the contents of database traffic and block certain content or database requests. The database firewall 348 may work on the SQL application level atop the TCP/IP stack, managing applications' connection to the database or SQL management interfaces as well as intercepting and enforcing packets traveling to or from a database network or application interface.

In some implementations, communication with the database storage system 356 may be conducted via the database switch 352. The multi-tenant database system 356 may include more than one hardware and/or software components for handling database queries. Accordingly, the database switch 352 may direct database queries transmitted by other components of the on-demand service environment (e.g., the pods 340 and 344) to the correct components within the database storage system 356.

In some implementations, the database storage system 356 is an on-demand database system shared by many different organizations. The on-demand database system may employ a multi-tenant approach, a virtualized approach, or any other type of database approach. An on-demand database system is discussed in greater detail with reference to FIGS. 4 and 5.

FIG. 3B shows a system diagram further illustrating an example of architectural components of an on-demand service environment, in accordance with some implementations. The pod 344 may be used to render services to a user of the on-demand service environment 300.

In some implementations, each pod may include a variety of servers and/or other systems. The pod 344 includes one or more content batch servers 364, content search servers 368, query servers 372, file force servers 376, access control system (ACS) servers 380, batch servers 384, and app servers 388. Also, the pod 344 includes database instances 390, quick file systems (QFS) 392, and indexers 394. In one or more implementations, some or all communication between the servers in the pod 344 may be transmitted via the switch 336.

In some implementations, the application servers 388 may include a hardware and/or software framework dedicated to the execution of procedures (e.g., programs, routines, scripts) for supporting the construction of applications provided by the on-demand service environment 300 via the pod 344. Some such procedures may include operations for providing the services described herein.

The content batch servers 364 may requests internal to the pod. These requests may be long-running and/or not tied to a particular customer. For example, the content batch servers 364 may handle requests related to log mining, cleanup work, and maintenance tasks.

The content search servers 368 may provide query and indexer functions. For example, the functions provided by the content search servers 368 may allow users to search through content stored in the on-demand service environment.

The Fileforce servers 376 may manage requests information stored in the Fileforce storage 378. The Fileforce storage 378 may store information such as documents, images, and basic large objects (BLOBs). By managing requests for information using the Fileforce servers 376, the image footprint on the database may be reduced.

The query servers 372 may be used to retrieve information from one or more file systems. For example, the query system 372 may receive requests for information from the app servers 388 and then transmit information queries to the NFS 396 located outside the pod.

The pod 344 may share a database instance 390 configured as a multi-tenant environment in which different organizations share access to the same database. Additionally, services rendered by the pod 344 may require various hardware and/or software resources. In some implementations, the ACS servers 380 may control access to data, hardware resources, or software resources.

In some implementations, the batch servers 384 may process batch jobs, which are used to run tasks at specified times. Thus, the batch servers 384 may transmit instructions to other servers, such as the app servers 388, to trigger the batch jobs.

In some implementations, the QFS 392 may be an open source file system available from Sun Microsystems® of Santa Clara, Calif. The QFS may serve as a rapid-access file system for storing and accessing information available within the pod 344. The QFS 392 may support some volume management capabilities, allowing many disks to be grouped together into a file system. File system metadata can be kept on a separate set of disks, which may be useful for streaming applications where long disk seeks cannot be tolerated. Thus, the QFS system may communicate with one or more content search servers 368 and/or indexers 394 to identify, retrieve, move, and/or update data stored in the network file systems 396 and/or other storage systems.

In some implementations, one or more query servers 372 may communicate with the NFS 396 to retrieve and/or update information stored outside of the pod 344. The NFS 396 may allow servers located in the pod 344 to access information to access files over a network in a manner similar to how local storage is accessed.

In some implementations, queries from the query servers 322 may be transmitted to the NFS 396 via the load balancer 320, which may distribute resource requests over various resources available in the on-demand service environment. The NFS 396 may also communicate with the QFS 392 to update the information stored on the NFS 396 and/or to provide information to the QFS 392 for use by servers located within the pod 344.

In some implementations, the pod may include one or more database instances 390. The database instance 390 may transmit information to the QFS 392. When information is transmitted to the QFS, it may be available for use by servers within the pod 344 without requiring an additional database call.

In some implementations, database information may be transmitted to the indexer 394. Indexer 394 may provide an index of information available in the database 390 and/or QFS 392. The index information may be provided to file force servers 376 and/or the QFS 392.

FIG. 4 shows a system diagram illustrating an example of the architecture of a multitenant database environment, in accordance with some implementations.

Figure 5:
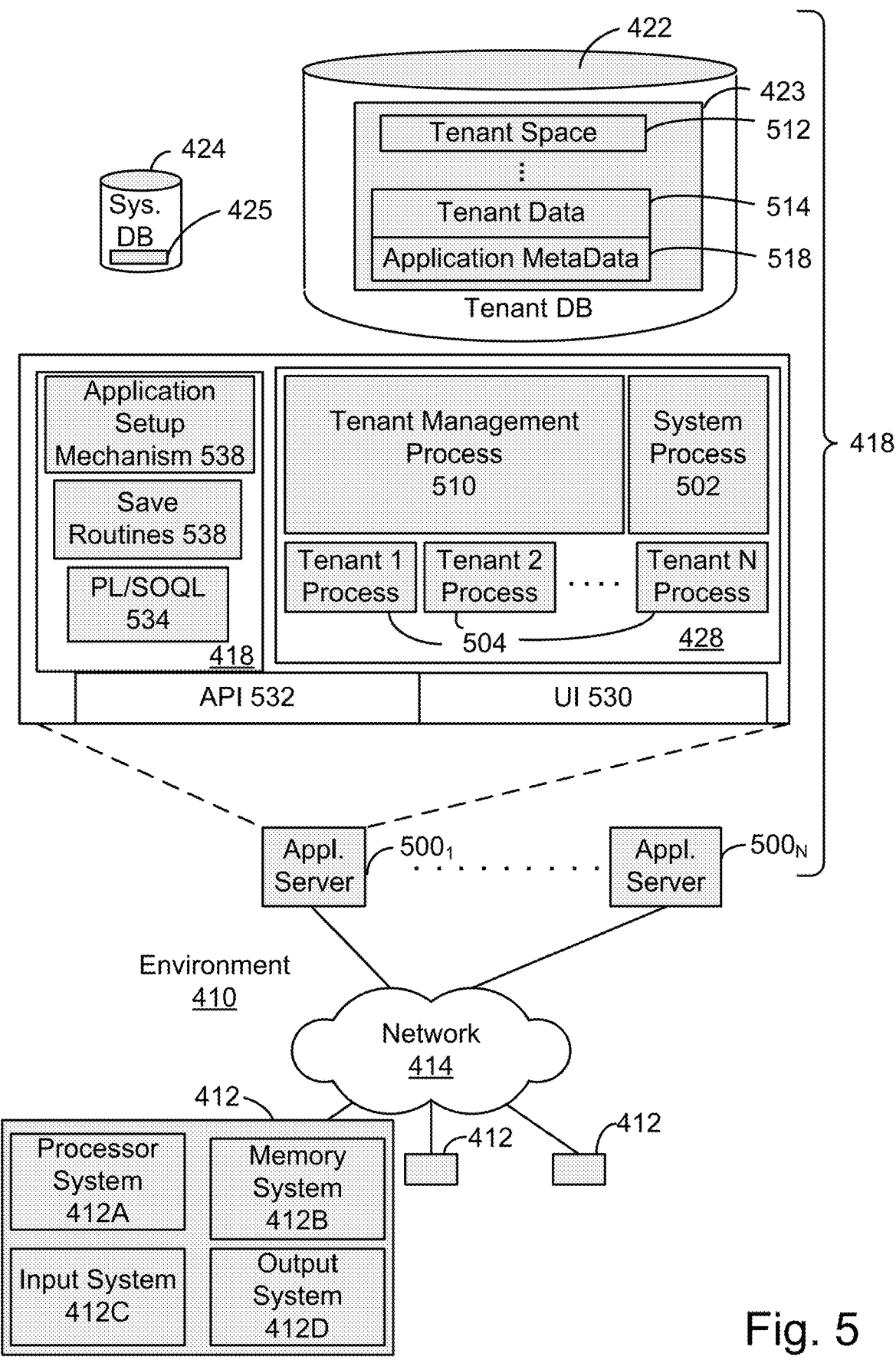
FIG. 5 shows a system diagram further illustrating an example of the architecture of a multitenant database environment, in accordance with some implementations.

Environment 410 includes an on-demand database service 416. User system 412 may be any client machine or system that is used by a user to access a database system. For example, any of user systems 412 can be a handheld computing device, a mobile phone, a laptop computer, a work station, and/or a network of computing devices. As illustrated in FIGS. 4 and 5, user systems 412 might interact via a network 414 with the on-demand database service 416.

An on-demand database service, such as system 416, is a database system that is made available to outside users that do not need to necessarily be concerned with building and/or maintaining the database system, but instead may be available for their use when the users need the database system (e.g., on the demand of the users). Some on-demand database services may store information from one or more tenants stored into tables of a common database image to form a multi-tenant database system (MTS).

Accordingly, "on-demand database service 416" and "system 416" will be used interchangeably herein. A database image may include one or more database objects. A relational database management system (RDBMS) or the equivalent may execute storage and retrieval of information against the database object(s). Application platform 418 may be a framework that allows the applications of system 416 to run, such as the hardware and/or software, e.g., the operating system. In an implementation, on-demand database service 416 may include an application platform 418 that enables creation, managing and executing one or more applications developed by the provider of the on-demand database service, users accessing the on-demand database service via user systems 412, or third party application developers accessing the on-demand database service via user systems 412.

One arrangement for elements of system 416 is shown in FIG. 4, including a network interface 420, application platform 418, tenant data storage 422 for tenant data 423, system data storage 424 for system data 425 accessible to system 416 and possibly multiple tenants, program code 426 for implementing various functions of system 416, and a process space 428 for executing MTS system processes and tenant-specific processes, such as running applications as part of an application hosting service. Additional processes that may execute on system 416 include database indexing processes.

The users of user systems 412 may differ in their respective capacities, and the capacity of a particular user system 412 might be entirely determined by permissions (permission levels) for the current user. For example, where a call center agent is using a particular user system 412 to interact with system 416, the user system 412 has the capacities allotted to that call center agent. However, while an administrator is using that user system to interact with system 416, that user system has the capacities allotted to that administrator. In systems with a hierarchical role model, users at one permission level may have access to applications, data, and database information accessible by a lower permission level user, but may not have access to certain applications, database information, and data accessible by a user at a higher permission level. Thus, different users may have different capabilities with regard to accessing and modifying application and database information, depending on a user's security or permission level.

Network 414 is any network or combination of networks of devices that communicate with one another. For example, network 414 can be any one or any combination of a LAN (local area network), WAN (wide area network), telephone network, wireless network, point-to-point network, star network, token ring network, hub network, or other appropriate configuration. As the most common type of computer network in current use is a TCP/IP (Transfer Control Protocol and Internet Protocol) network (e.g., the Internet), that network will be used in many of the examples herein. However, it should be understood that the networks used in some implementations are not so limited, although TCP/IP is a frequently implemented protocol.

User systems 412 might communicate with system 416 using TCP/IP and, at a higher network level, use other common Internet protocols to communicate, such as HTTP, FTP, AFS, WAP, etc. In an example where HTTP is used, user system 412 might include an HTTP client commonly referred to as a "browser" for sending and receiving HTTP messages to and from an HTTP server at system 416. Such an HTTP server might be implemented as the sole network interface between system 416 and network 414, but other techniques might be used as well or instead. In some implementations, the interface between system 416 and network 414 includes load sharing functionality, such as round-robin HTTP request distributors to balance loads and distribute incoming HTTP requests evenly over a plurality of servers. At least as for the users that are accessing that server, each of the plurality of servers has access to the MTS' data; however, other alternative configurations may be used instead.

In one implementation, system 416, shown in FIG. 4, implements a web-based customer relationship management (CRM) system such as the service cloud console. For example, in one implementation, system 416 includes application servers configured to implement and execute CRM software applications as well as provide related data, code, forms, web pages and other information to and from user systems 412 and to store to, and retrieve from, a database system related data, objects, and Webpage content. With a multi-tenant system, data for multiple tenants may be stored in the same physical database object, however, tenant data typically is arranged so that data of one tenant is kept logically separate from that of other tenants so that one tenant does not have access to another tenant's data, unless such data is expressly shared. In certain implementations, system 416 implements applications other than, or in addition to, a CRM application. For example, system 416 may provide tenant access to multiple hosted (standard and custom) applications. User (or third party developer) applications, which may or may not include CRM, may be supported by the application platform 418, which manages creation, storage of the applications into one or more database objects and executing of the applications in a virtual machine in the process space of the system 416.

Each user system 412 could include a desktop personal computer, workstation, laptop, PDA, cell phone, or any wireless access protocol (WAP) enabled device or any other computing device capable of interfacing directly or indirectly to the Internet or other network connection. User system 412 typically runs an HTTP client, e.g., a browsing program, such as Microsoft's Internet Explorer® browser, Mozilla's Firefox® browser, Opera's browser, or a WAP-enabled browser in the case of a cell phone, PDA or other wireless device, or the like, allowing a user (e.g., subscriber of the multi-tenant database system) of user system 412 to access, process and view information, pages and applications available to it from system 416 over network 414.

Each user system 412 also typically includes one or more user interface devices, such as a keyboard, a mouse, trackball, touch pad, touch screen, pen or the like, for interacting with a graphical user interface (GUI) provided by the browser on a display (e.g., a monitor screen, LCD display, etc.) in conjunction with pages, forms, applications and other information provided by system 416 or other systems or servers. For example, the user interface device can be used to access data and applications hosted by system 416, and to perform searches on stored data, and otherwise allow a user to interact with various GUI pages that may be presented to a user. As discussed above, implementations are suitable for use with the Internet, which refers to a specific global internetwork of networks. However, it should be understood that other networks can be used instead of the Internet, such as an intranet, an extranet, a virtual private network (VPN), a non-TCP/IP based network, any LAN or WAN or the like.

According to one implementation, each user system 412 and all of its components are operator configurable using applications, such as a browser, including computer code run using a central processing unit such as an Intel Pentium® processor or the like. Similarly, system 416 (and additional instances of an MTS, where more than one is present) and all of their components might be operator configurable using application(s) including computer code to run using a central processing unit such as processor system 417, which may include an Intel Pentium® processor or the like, and/or multiple processor units.

A computer program product implementation includes a machine-readable storage medium (media) having instructions stored thereon/in which can be used to program a computer to perform any of the processes of the implementations described herein. Computer code for operating and configuring system 416 to intercommunicate and to process web pages, applications and other data and media content as described herein are preferably downloaded and stored on a hard disk, but the entire program code, or portions thereof, may also be stored in any other volatile or non-volatile memory medium or device, such as a ROM or RAM, or provided on any media capable of storing program code, such as any type of rotating media including floppy disks, optical discs, digital versatile disk (DVD), compact disk (CD), microdrive, and magneto-optical disks, and magnetic or optical cards, nanosystems (including molecular memory ICs), or any type of media or device suitable for storing instructions and/or data. Additionally, the entire program code, or portions thereof, may be transmitted and downloaded from a software source over a transmission medium, e.g., over the Internet, or from another server, or transmitted over any other conventional network connection (e.g., extranet, VPN, LAN, etc.) using any communication medium and protocols (e.g., TCP/IP, HTTP, HTTPS, Ethernet, etc.). It will also be appreciated that computer code for implementing implementations can be implemented in any programming language that can be executed on a client system and/or server or server system such as, for example, C, C++, HTML, any other markup language, Java™, JavaScript®, ActiveX®, any other scripting language, such as VBScript, and many other programming languages as are well known may be used. (Java™ is a trademark of Sun Microsystems®, Inc.).

According to one implementation, each system 416 is configured to provide web pages, forms, applications, data and media content to user (client) systems 412 to support the access by user systems 412 as tenants of system 416. As such, system 416 provides security mechanisms to keep each tenant's data separate unless the data is shared. If more than one MTS is used, they may be located in close proximity to one another (e.g., in a server farm located in a single building or campus), or they may be distributed at locations remote from one another (e.g., one or more servers located in city A and one or more servers located in city B). As used herein, each MTS could include logically and/or physically connected servers distributed locally or across one or more geographic locations. Additionally, the term "server" is meant to include a computer system, including processing hardware and process space(s), and an associated storage system and database application (e.g., OODBMS or RDBMS) as is well known in the art.

It should also be understood that "server system" and "server" are often used interchangeably herein. Similarly, the database object described herein can be implemented as single databases, a distributed database, a collection of distributed databases, a database with redundant online or offline backups or other redundancies, etc., and might include a distributed database or storage network and associated processing intelligence.

FIG. 5 shows a system diagram further illustrating an example of the architecture of a multitenant database environment, in accordance with some implementations. FIG. 5 shows that user system 412 may include processor system 412A, memory system 412B, input system 412C, and output system 412D. FIG. 5 shows network 414 and system 416. FIG. 5 also shows that system 416 may include tenant data storage 422, tenant data 423, system data storage 424, system data 425, User Interface (UI) 530, Application Program Interface (API) 532, PL/SOQL 534, save routines 536, application setup mechanism 538, applications servers 5001-500N, system process space 502, tenant process spaces 504, tenant management process space 510, tenant storage area 512, user storage 514, and application metadata 516. In other implementations, environment 410 may not have the same elements as those listed above and/or may have other elements instead of, or in addition to, those listed above.

User system 412, network 414, system 416, tenant data storage 422, and system data storage 424 were discussed above in FIG. 4. Regarding user system 412, processor system 412A may be any combination of processors. Memory system 412B may be any combination of one or more memory devices, short term, and/or long term memory. Input system 412C may be any combination of input devices, such as keyboards, mice, trackballs, scanners, cameras, and/or interfaces to networks. Output system 412D may be any combination of output devices, such as monitors, printers, and/or interfaces to networks. As shown by FIG. 5, system 416 may include a network interface 420 (of FIG. 4) implemented as a set of HTTP application servers 500, an application platform 418, tenant data storage 422, and system data storage 424. Also shown is system process space 502, including individual tenant process spaces 504 and a tenant management process space 510. Each application server 500 may be configured to tenant data storage 422 and the tenant data 423 therein, and system data storage 424 and the system data 425 therein to serve requests of user systems 412. The tenant data 423 might be divided into individual tenant storage areas 512, which can be either a physical arrangement and/or a logical arrangement of data. Within each tenant storage area 512, user storage 514 and application metadata 516 might be similarly allocated for each user. For example, a copy of a user's most recently used (MRU) items might be stored to user storage 514. Similarly, a copy of MRU items for an entire organization that is a tenant might be stored to tenant storage area 512. A UI 530 provides a user interface and an API 532 provides an application programmer interface to system 416 resident processes to users and/or developers at user systems 412. The tenant data and the system data may be stored in various databases, such as Oracle™ databases.

Application platform 418 includes an application setup mechanism 538 that supports application developers' creation and management of applications, which may be saved as metadata into tenant data storage 422 by save routines 536 for execution by subscribers as tenant process spaces 504 managed by tenant management process 510 for example. Invocations to such applications may be coded using PL/SOQL 34 that provides a programming language style interface extension to API 532. A detailed description of some PL/SOQL language implementations is discussed in commonly assigned U.S. Pat. No. 7,730,478, titled METHOD AND SYSTEM FOR ALLOWING ACCESS TO DEVELOPED APPLICATIONS VIA A MULTI-TENANT ON-DEMAND DATABASE SERVICE, by Craig Weissman, filed Sep. 21, 2007, which is hereby incorporated by reference in its entirety and for all purposes. Invocations to applications may be detected by system processes, which manage retrieving application metadata 516 for the subscriber making the invocation and executing the metadata as an application in a virtual machine.

Each application server 500 may be communicably coupled to database systems, e.g., having access to system data 425 and tenant data 423, via a different network connection. For example, one application server 5001 might be coupled via the network 414 (e.g., the Internet), another application server 500N-1 might be coupled via a direct network link, and another application server 500N might be coupled by yet a different network connection. Transfer Control Protocol and Internet Protocol (TCP/IP) are typical protocols for communicating between application servers 500 and the database system. However, other transport protocols may be used to optimize the system depending on the network interconnect used.

In certain implementations, each application server 500 is configured to handle requests for any user associated with any organization that is a tenant. Because it is desirable to be able to add and remove application servers from the server pool at any time for any reason, there is preferably no server affinity for a user and/or organization to a specific application server 500. In one implementation, therefore, an interface system implementing a load balancing function (e.g., an F5 Big-IP load balancer) is communicably coupled between the application servers 500 and the user systems 412 to distribute requests to the application servers 500. In one implementation, the load balancer uses a least connections algorithm to route user requests to the application servers 500. Other examples of load balancing algorithms, such as round robin and observed response time, also can be used. For example, in certain implementations, three consecutive requests from the same user could hit three different application servers 500, and three requests from different users could hit the same application server 500. In this manner, system 416 is multi-tenant, wherein system 416 handles storage of, and access to, different objects, data and applications across disparate users and organizations.

As an example of storage, one tenant might be a company that employs a sales force where each call center agent uses system 416 to manage their sales process. Thus, a user might maintain contact data, leads data, customer follow-up data, performance data, goals and progress data, etc., all applicable to that user's personal sales process (e.g., in tenant data storage 422). In an example of a MTS arrangement, since all of the data and the applications to access, view, modify, report, transmit, calculate, etc., can be maintained and accessed by a user system having nothing more than network access, the user can manage his or her sales efforts and cycles from any of many different user systems. For example, if a call center agent is visiting a customer and the customer has Internet access in their lobby, the call center agent can obtain critical updates as to that customer while waiting for the customer to arrive in the lobby.

While each user's data might be separate from other users' data regardless of the employers of each user, some data might be organization-wide data shared or accessible by a plurality of users or all of the users for a given organization that is a tenant. Thus, there might be some data structures managed by system 416 that are allocated at the tenant level while other data structures might be managed at the user level. Because an MTS might support multiple tenants including possible competitors, the MTS should have security protocols that keep data, applications, and application use separate. Also, because many tenants may opt for access to an MTS rather than maintain their own system, redundancy, up-time, and backup are additional functions that may be implemented in the MTS. In addition to user-specific data and tenant specific data, system 416 might also maintain system level data usable by multiple tenants or other data. Such system level data might include industry reports, news, postings, and the like that are sharable among tenants.

In certain implementations, user systems 412 (which may be client machines/systems) communicate with application servers 500 to request and update system-level and tenant-level data from system 416 that may require sending one or more queries to tenant data storage 422 and/or system data storage 424. System 416 (e.g., an application server 500 in system 416) automatically generates one or more SQL statements (e.g., SQL queries) that are designed to access the desired information. System data storage 424 may generate query plans to access the requested data from the database.

Each database can generally be viewed as a collection of objects, such as a set of logical tables, containing data fitted into predefined categories. A "table" is one representation of a data object, and may be used herein to simplify the conceptual description of objects and custom objects according to some implementations. It should be understood that "table" and "object" may be used interchangeably herein. Each table generally contains one or more data categories logically arranged as columns or fields in a viewable schema. Each row or record of a table contains an instance of data for each category defined by the fields. For example, a CRM database may include a table that describes a customer with fields for basic contact information such as name, address, phone number, fax number, etc. Another table might describe a purchase order, including fields for information such as customer, product, sale price, date, etc. In some multi-tenant database systems, standard entity tables might be provided for use by all tenants. For CRM database applications, such standard entities might include tables for account, contact, lead, and opportunity data, each containing pre-defined fields. It should be understood that the word "entity" may also be used interchangeably herein with "object" and "table".

In some multi-tenant database systems, tenants may be allowed to create and store custom objects, or they may be allowed to customize standard entities or objects, for example by creating custom fields for standard objects, including custom index fields. U.S. Pat. No. 7,779,039, titled CUSTOM ENTITIES AND FIELDS IN A MULTI-TENANT DATABASE SYSTEM, by Weissman, et al., and which is hereby incorporated by reference in its entirety and for all purposes, teaches systems and methods for creating custom objects as well as customizing standard objects in a multi-tenant database system. In some implementations, for example, all custom entity data rows are stored in a single multi-tenant physical table, which may contain multiple logical tables per organization. In some implementations, multiple "tables" for a single customer may actually be stored in one large table and/or in the same table as the data of other customers.

The implementations disclosed herein may include a cross-domain API situated at a client machine that allows pages served from external domains to perform certain actions, such as exchanging information with one another, within a web browser program running on the client machine. These pages may be referred to as "third party pages." FIGS. 6A and 6B show flow diagrams illustrating interactions of third party pages, in accordance with one or more implementations. In one or more implementations, this cross-domain API may be referred to as a service cloud console integration toolkit.

Call centers that use the service cloud console may have integrations to third party systems, such as billing systems, shipping systems, accounting systems, etc. The service cloud console may provide an interface that allows agents access to one or more of these applications. In some implementations, one or more of these third party applications may participate in the tabbed model provided through the service cloud console.

Because communication between frames from different domains presents a security risk within the browsers, this functionality is explicitly restricted in some modern browsers. In other modern browsers, however, cross-domain communication has been addressed, for instance, in HTML 5 (available from W3.org at http://www.w3.org/TR/html5/comms.html) with the postMessage framework. However, HTML 5 is currently supported in only a limited number of browsers, such as Internet Explorer 8, Firefox 3, and Opera 9.

In some implementations, the cross-domain API may be used to facilitate integration with third party pages within Salesforce.com® itself. For example, VisualForce™ pages may be served from a different domain than the service cloud console.

Given the potential security concerns, it may be desirable to avoid exposing the ability for a third-party domain to directly perform data manipulation. For example, in Salesforce.com® it may be possible to open an edit page, make modifications to an object, and save it, all by opening a single URL with a set of parameters in the query string. However, this type of operation may not be permitted by the cross-domain API, as it could open up a means for attackers to modify data without the user's knowledge or consent.

The third party page communication methods shown in FIGS. 6A and 6B may be used to facilitate secure cross-domain communication. These methods may be run in a web browser at a client machine in communication with one or more servers that provide data to the browser. However, some or all of the individual processing steps shown in FIGS. 6A and 6B may be performed without communication with the server. Thus, cross-domain communications may be facilitated without requiring the additional latency or computational burdens that would exist if cross-domain communications were accomplished using a proxy or other type of server communication.

In one implementation, in 604, a service cloud console application from the data provider is loaded from a first domain, such as www.salesforce.com. The console application may be loaded by sending instructions from one or more data provider servers hosting the first domain to a web browser at a client machine. When the console application is loaded, records served from the first domain may be visible in the console application. For example, one or more records may be opened using a record open method, as shown in FIG. 2.

In 608, a third party web page is loaded from a second domain, for instance, from phone system 68, in a portion of a user interface also displaying the console application. In some implementations, the third party web page may be loaded as a primary or secondary tab within the console application. The third party web page may also be automatically loaded in response to receiving data from the console application. For example, a first object record may include a link to accounting information visible through a third party web page. When the link is clicked, the third party web page is loaded.

In some implementations, the first domain is controlled by a data provider, e.g., Salesforce.com®, while the second domain may be controlled by a different entity, such as the phone provider. For example, the console application may be loaded from a first domain controlled by Salesforce.com®, while the third party page is loaded from a second domain controlled by a third party service provider unaffiliated with the service provider controlling the first domain In 612, the console application is configured to listen to events from a first set of safe domains. The first set of safe domains identifies the one or more trusted domains from which the console application may safely accept cross-domain messages. In some implementations, the first set of safe domains may be limited to a particular group of domains, such as those provided by the data provider of the console application. The first set of safe domains may also include domains identified as trusted, such as the second domain associated with a third party service provider system.

In some implementations, wildcards may be used to identify groups of domains using a single string. For example, the first set of safe domains may include domains such as na1.force.com, *.na2.force.com, and/or *.salesforce.com.

In 616, the third party page may detect or generate an event of some type, such as the receipt of phone event information from some source, as described above. The detected event may include any type of occurrence that causes cross-domain communication. In some implementations, the event may be a scripting event triggered directly by a user action, such as clicking a link or button within the third party page. Alternately, or additionally, the event may be generated by code running within the third party page that identifies a triggering condition.

In 620, the event triggers a message that is sent to the console application. The message may include a JavaScript® event message, or other type of event message. The message may be sent to a JavaScript® Event Listener operating in the console application served from the first domain. Alternately, or additionally, a different type of scripting language may be used, such as VBScript.

When the event message is received, the console application identifies the domain from which the event message was sent (i.e. the second domain), as shown at 624. The domain may be identified by retrieving a value associated with the event message. After the second domain is identified as the source of the event, the second domain is compared to the first set of safe domains, as shown at 628.

As shown at 632, if the second domain is not within the first set of safe domains, then the message is ignored. In this case, the second domain has not been identified as a "safe" domain from which to receive messages. By only accepting messages sent from an identified subset of domains, the security risks inherent in cross-domain communications may be mitigated.

In some implementations, receiving a cross-domain event message from a third party domain not in the first set of safe domains may cause one or more security or logging actions to be taken. For example, the event message may be logged in a security record to help identify unauthorized attempts to access the service cloud console application.

As shown at 636, the event message is processed if the second domain is within the first set of safe domains. The event message may be processed according to one or more event handlers in the console application.

In some implementations, even domains included in the first set of safe domains may be limited to triggering particular actions or types of actions within the console application, in order to provide further protection against unauthorized access. Examples of such actions are discussed below. However, different implementations may allow various actions or types of actions in response to an event message.

Regardless of whether the event message is processed, the service cloud console may continue monitoring for additional messages transmitted from third party domains. Continual monitoring for cross-domain event messages may be accomplished using, for example, an Observer design pattern. Thus, the third party page may be able to send messages to the service cloud console, while the security of the console application is maintained.

FIG. 6B shows a complementary third party page communication method B for transmitting messages from the console application to a third party page. The method shown in FIG. 6B is similar to the method shown in FIG. 6A in some respects, with like reference numerals indicating like operations.

In some implementations, a different set of safe domains may be identified at 662 than at 612. For example, the second set of safe domains may be limited to domains associated with the service cloud console (e.g., *.force.com, *.salesforce.com), while the first set of safe domains may include one or more domains associated with third party service providers. By using different sets of safe domains, the security of the third party pages may be maintained because the third party pages may not be operable to communicate with each other.

In 666, an event within the console application is detected, similar to 616. In 670, an event message from the console application is communicated to the third party page, similar to 620. In some implementations, a different set of actions or types of actions may be allowed in response to receiving an event message from an accepted domain, as shown at 686. In both figures, the set of allowable actions or types of actions may be strategically determined based on security concerns and the type of cross-domain communication that is needed to facilitate integration.

In some implementations, the methods shown in FIGS. 6A and 6B may be performed concurrently, thus allowing for secure cross-domain two-way communication between the console application and the third party page. Alternately, one of the methods shown in FIGS. 6A and 6B may be omitted so that only one-way cross-domain communication is allowed.

The cross-domain API is described with reference to a pseudocode implementation according to some implementations. However, the pseudocode is provided only as an example, and some implementations may employ a different implementation. For example, cross-domain API methods may be specified using some methods, method names, parameters, and/or parameter names (e.g., method(parameter1:type, parameter2:type):returntype). However, different methods, method names, parameters, and/or parameters names may be used in different implementations. As another example, at least part of the cross-domain API pseudocode here may appear as methods that return values synchronously. However, some implementations may include one or more methods that return values asynchronously (e.g., via a callback method).

Developers may be able to import one or more libraries into various pages, but some methods within these libraries may be prevented from operating unless the pages are run in a designated context.

Third party pages may have the ability to open primary tabs, subtabs, or both. Primary tabs and subtabs opened from third party pages may follow navigation rules similar to standard pages. For example, duplicate pages may not be allowed by default. However, developers may be permitted to allow duplicate pages. As another example, third party pages may behave with back, forward, and/or refresh buttons in a manner similar to standard pages.

A page may only be able to manipulate itself and the tabs which it has opened itself. If a VisualForce™ page is embedded on a standard page, it may be able to manipulate the tab in which it is contained.

Workspace Objects

This section describes properties of workspace objects in one or more implementations.

In one or more implementations, an administrator may map a field on an object to a workspaceable object using a workspace driver field. When an object has a field configured in this way, it may become a subordinate object. In this case, the object may only open in the workspace of the object to which it is subordinate. Each object may be limited to one workspace driver field.

For example, one custom object may be a bill. A bill may have fields such as amount (a currency), account (a lookup to account), and contact (a lookup to contact). One of these fields, or the bill itself, may be the workspace driver. If account is set as the workspace driver field, then when opening a bill, the account will appear in the workspace tab, and the bill will appear as a subtab.

In one or more implementations, almost any object may be a workspace object. A workspace driver field may be used to define what workspace an object will open in if not its own. Those driver fields may be selectable from the set of lookup relationships on a given object. Any of an object's relationships may be available in this list.

Despite the existence of a workspace driver field, an object may open in its own workspace if it happens to be orphaned. For example, a case object may be configured such that the parent account is its workspace object, but the user may open a case which is orphaned, (i.e. its parent account is null). In this event, the case may open in its own workspace, even though under normal circumstances cases don't do so.

In one or more implementations, each objects have a highlights panel layout. If no highlights panel is defined for an object, its mini view layout may be used by default. This layout may be specified by the same mechanism used by the "deal view."

In one or more implementations, only non-setup entities may be included in the metadata allowing end users to choose their workspace properties. Setup entities like user may implicitly be configured as "Opens In Itself."

In one or more implementations, VisualForce™ pages may be configurable as workspaceable pages or as subordinate objects. In the event that a VisualForce™ page is workspaceable, it may be allowed to omit the highlights panel.

In one or more implementations, objects selected from a subtab may stay within the context of that workspace. For example, suppose contact is a workspaceable object and an account is open. A contact opened from the account details section may open as a subtab under the account and not in its own contact workspace. Even though contact is a workspaceable object, it may be opened in the context of an account. In some implementations, a user may drag the contact tab up to workspace bar to make it its own workspace and/or drag one or more workspaces into subtabs.

Smart Text Filters

Figure 9:
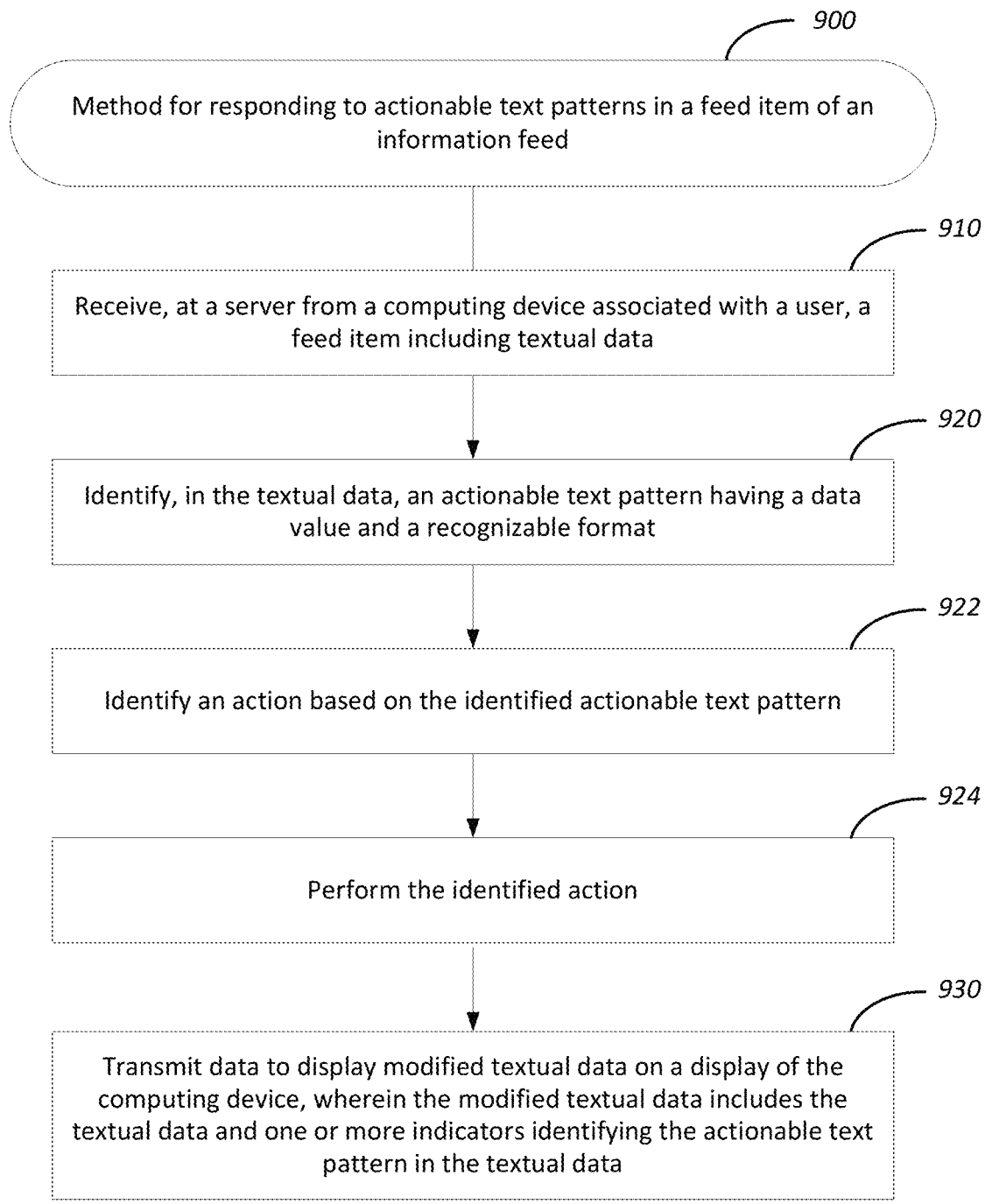
FIG. 9 shows a flowchart of an example of computer implemented method 900 for responding to actionable text patterns in a feed item of an information feed of a customer service agent working in an on-demand services environment, in accordance with some implementations.

FIG. 9 shows a flowchart of an example of computer implemented method 900 for responding to actionable text patterns in a feed item of an information feed of a customer service agent working in an on-demand services environment, in accordance with some implementations.

In FIG. 9, at block 910, a server in a customer service environment receives, from a computing device associated with a user, a feed item including textual data. In some implementations, the feed item may be one of an email, a comment, an information update, or a field displayed in an information feed of the customer service agent working in the CRM environment. The feed item may have been composed by the customer service agent and submitted to the server by the agent to be published in an information feed. Alternatively, the feed item may have been composed and published by another user and is to be published in the information feed of the customer service agent. In some implementations, the computing device may be a personal computer used by the customer service agent. In other implementations, the computing device may be any mobile device, such as a cell phone, a smart phone, a tablet, a Bluetooth-enabled device, Google glass, a smart watch, and the like.

In FIG. 9, at block 920, the server performing method 900 identifies an actionable text pattern in the textual data. In some implementations, the actionable text pattern may begin with a common prefix. The common prefix may be one or more characters designated by the CRM environment. As an example, the common prefix may be an invoke character "@" that was prepended to an entity name in the textual data. The server may identify the prefix and identify the word or phrase that includes the prefix as an actionable text pattern. For example, the user composing the feed item may have included the text "@Steve Smith" in the textual data of the feed item. The server may recognize the "@" as the designated prefix for actionable text in the CRM environment, and may identify "@Steve Smith" as actionable text.

In other implementations, actionable text patterns might not utilize a common prefix. In these implementations, the server may identify actionable text based on the contents of the textual data. For example, if the textual data includes the text "Steve Smith", which identifies a user in the CRM environment named Steve Smith, the server may recognize the "Steve Smith" text and identify it as actionable text. The actionable text pattern may be a character, a word, a phrase, or a sentence.

In some implementations, the actionable text pattern may be a data value having a recognizable format, such as an email address, a phone number, a date, an account number, a case number, and a time. As an example, the server may recognize the format of phone numbers as "XXX-XXX-XXXX" of the data value and thus recognize "510-555-1234" as a phone number that may be dialed in a phone application. In some implementations, where the computing device does not include an application that may act on the data value, the data value may not be displayed as an actionable text pattern. For example, if the computing device does not have the capability to dial a phone number, the data value "510-555-1234" may not be highlighted in the user interface as an actionable text pattern.

In other implementations, the actionable text pattern may identify an object record stored in a database of the CRM environment. The identified object record may be one of: a user account record, a case record, a group record, an organization record, and a company record.

In FIG. 9, at block 922, the server performing method 900 identifies an action based on the identified actionable text pattern. For example, if the actionable text pattern has the format of a hyperlink, the action may be to transform the plain text into hyperlink text. As another example, if the actionable text pattern has the format of a poll, with a plea such as "please choose" and a series of options, each beginning with a dash, then the action may be to turn that plain text poll into an actual poll with selectable options. As another example, the actionable text pattern may include a name, a phone number, and an email address. In this case, the action may be to create a contact record containing the name, phone number, and email address. The actionable text pattern may be any textual data that has a recognizable format, and the action may be any action that may be performed on the actionable text pattern, based on its format.

In FIG. 9, at block 924, the server performing method 900 performs the identified action.

In FIG. 9, at block 930, the server performing method 900 transmits data to display modified textual data on a display of the computing device. The modified textual data may be displayed in response to a user selecting the feed item to be displayed. In some implementations, the modified textual data may include one or more indicators identifying the actionable text pattern in the textual data. The indicators may indicate to a user that the actionable text patterns may be selected for particular actions. The actionable text patterns may appear as links in the display of the modified textual data. In some implementations, the indicators identifying the actionable text patterns may be underlining, highlighting, bolding, italicizing, coloring, or otherwise distinguishing the actionable text patterns from the rest of the textual data.

In some implementations, the one or more indicators may be displayed responsive to identifying an application of the computing device that has functionality to act on the data value. For example, if the data value is a phone number, then an indicator may displayed if a phone dialing application is identified in the computing device.

FIGS. 12A and 12B show examples of a graphical user interface (GUI) displaying textual data containing one or more actionable text patterns, in accordance with one or more implementations. FIG. 12A presents an example of textual data that is received by the server. In the example, the textual data is a message from Mary to Sarah within a CRM environment. The textual data includes recognizable data values, such as "510-555-5555" and "Tuesday, August 5th", which the server can recognize as a phone number and date. The textual data also includes references to entities that a server may recognize as matching names of user records and case records in the CRM environment, such as "Dan Brown", "Steve Smith", and "Mary Lamardo". FIG. 12B presents an example of the modified textual data that is transmitted by the server and displayed by the computing device, where the actionable text patterns appear as blue links in the display. In some implementations, clicking on the "Tuesday, August 5th" date link may redirect to a create calendar appointment form for a meeting with the date populated, with "Dan Brown" and "Steve Smith" as invitees to the meeting, with "case #124" associated with the meeting, and with "510-555-5555" as the dial number for the meeting.

Figure 10:
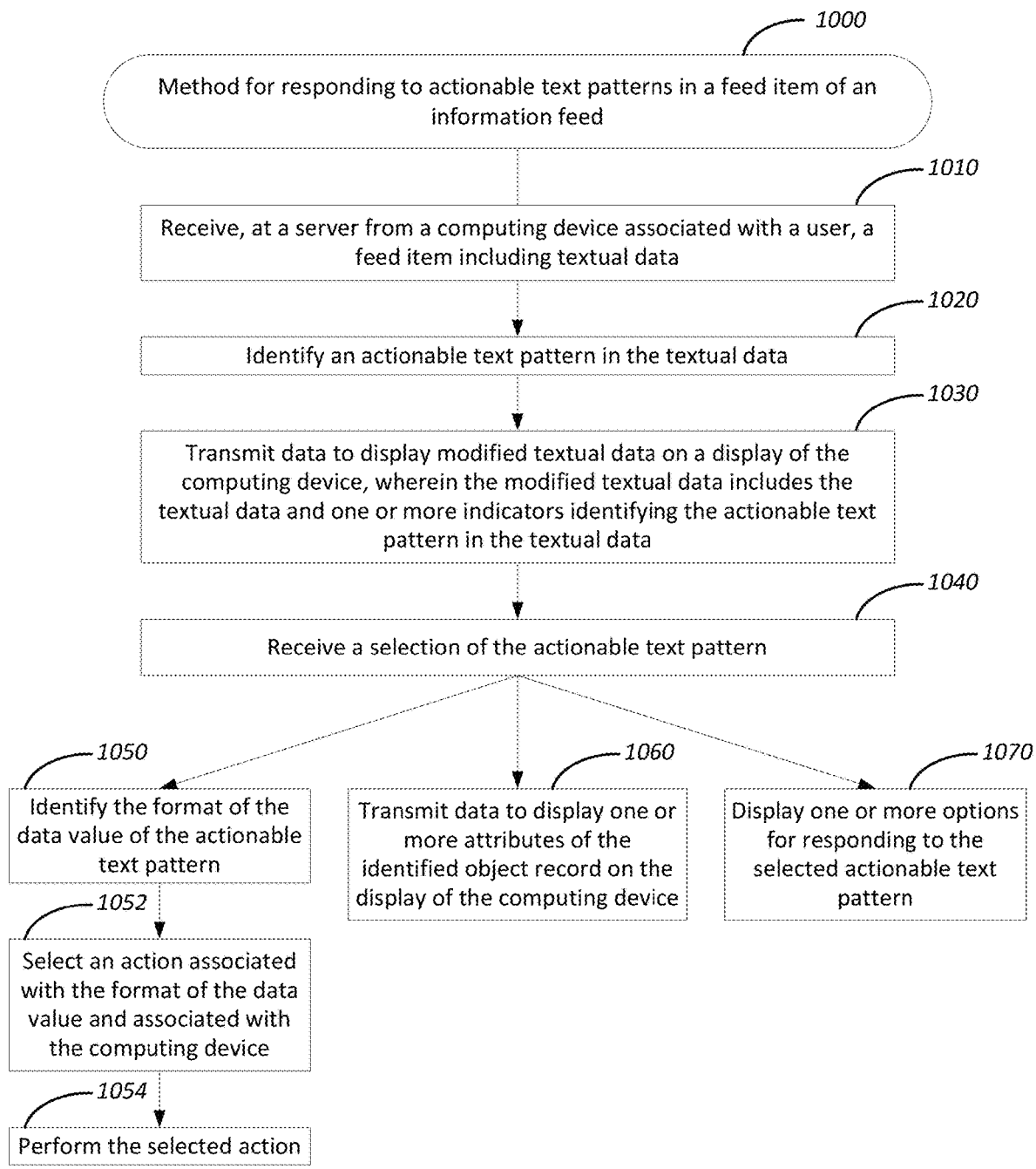
FIG. 10 shows a flowchart of an example of computer implemented method 1000 for responding to actionable text patterns in a feed item of an information feed of a customer service agent working in an on-demand services environment, in accordance with some implementations.

FIG. 10 shows a flowchart of an example of computer implemented method 1000 for responding to actionable text patterns in a feed item of an information feed of a customer service agent working in an on-demand services environment, in accordance with some implementations.

In FIG. 10, at block 1010, a server of the CRM environment receives, from a computing device associated with a user, a feed item including textual data, as generally described above at block 910 of FIG. 9.

In FIG. 10, at block 1020, the server performing method 1000 identifies an actionable text pattern in the textual data, as generally described above at block 920 of FIG. 9.

In FIG. 10, at block 1030, the server performing method 1000 transmits data to display modified textual data on a display of the computing device, as generally described above at block 930 of FIG. 9.

In FIG. 10, at block 1040, the server performing method 1000 receives a selection of the actionable text pattern. In some implementations, the actionable text pattern is selected by a user by clicking or pressing on the actionable text pattern, or by hovering over the actionable text pattern. Depending on the type of the actionable text pattern, the computing device may respond to the selection of the actionable text pattern in different ways. In some implementations, the selection may be automatic for some actionable text patterns.

In FIG. 10, at block 1050, the server performing method 1000 identifies the format of the data value of the actionable text pattern. In some implementations, the server is able to identify actionable text patterns in the textual data because it is able to recognize the formats of certain values. For example, the server may be configured to recognize dates and times in various formats, phone numbers, email addresses, or even account numbers that follow a particular format.

In FIG. 10, at block 1052, the server performing method 1000 selects an action associated with the format of the data value and associated with the computing device. An action may be associated with computing device if the computing device is capable of performing the action. An action may be associated with a format of a data value if the action may be validly performed on the data value having that format. As an example, if the data value is a phone number having a phone number format ((XXX) XXX-XXXX), and the computing device is a mobile phone that is capable of dialing phone numbers, then the computing device may select a "phone call" action. As another example, if the computing device is a mobile device that has a Skype application that is capable of making phone calls, the computing device may select a "Skype call" action. Alternatively, if the computing device does not include any applications or functionalities that can execute a phone call, then the data value may not displayed as an actionable text pattern.

In FIG. 10, at block 1054, the server performing method 1000 performs the selected action. In the example of a phone number, the selected action may be dialing a phone number on a mobile phone, or initiating a Skype call on a mobile device.

In FIG. 10, at block 1060, the server performing method 1000 transmits data to display one or more attributes of the identified object record. In some implementations, the actionable text pattern identifies an object record. In these implementations, clicking on an actionable text pattern may cause the user interface to open up the object record to display its object record attributes. In another implementation, a popup may appear to display some of the attributes of the identified object record. As an example, the actionable text pattern may be "Steve Smith", and it may identify an object record for the user Steve Smith. Clicking on the actionable text pattern may cause some of Steve Smith's profile and contact information to appear in the user interface. Alternatively, clicking on "Steve Smith" may cause the user interface to open up a window to display Steve Smith's entire user profile. As another example, the actionable text pattern may be "Case #214." Clicking on the text may cause some case information for Case #214 to be displayed in the user interface. The attributes for the case information may be stored in a separate database of the CRM environment.

In FIG. 10, at block 1070, the server performing method 1000 display one or more options for responding to the selected actionable text pattern. In some implementations, the actionable text pattern may identify a data value or an object record on which various actions may be performed. For example, if the data value is a phone number, a mobile device displaying the data value could either dial the phone number or send a text message. In some implementations, hovering over or clicking on the phone number may cause a popup window to open, presenting the options to "call" or to "send a message" to the phone number.

As another example, the selected actionable text pattern may be a date, and one of the displayed options may be to create a calendar event. Selecting on this option may open a calendar event creation form for the selected date. In some implementations, the context of the textual input may be searched for values that may map to fields of the calendar event being created. For example, a location for the event may be identified in the feed item. Also, other individuals who are attending the event may be identified in the feed item.

FIG. 13 shows an example of a GUI displaying textual data containing one or more actionable text patterns, in accordance with one or more implementations. In the example, when the user hovers over or clicks on the actionable text "eiusmod", a popup presents additional details about the Eiusmod object record, and presents two actions, "Action 1" and "Action 2" that may be executed for the object record. As an example, if Eiusmod is a case record, the two actions may be to "open case" or to "follow case." Opening the case may open the case in another user interface component. Following the case may cause information updates for the case to appear in the user's information feed.

Figure 11:
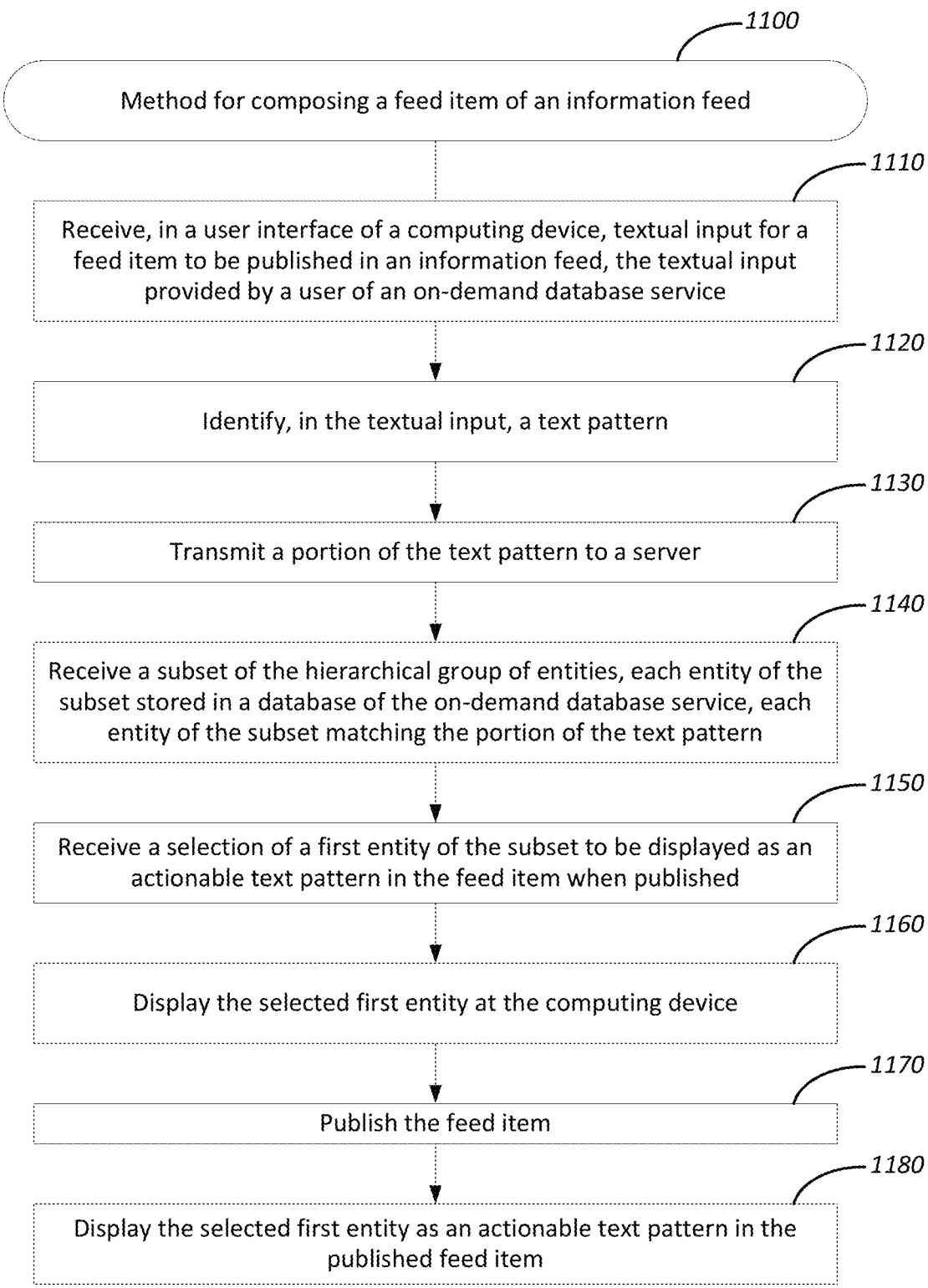
FIG. 11 shows a flowchart of an example of computer implemented method 1100 composing a feed item of an information feed of a customer service agent working in an on-demand services environment, in accordance with some implementations.

FIG. 11 shows a flowchart of an example of computer implemented method 1100 composing a feed item of an information feed of a customer service agent working in an on-demand services environment, in accordance with some implementations.

In FIG. 11, at block 1110, a computing device receives, in a user interface of a computing device, textual input for a feed item to be published in an information feed. The textual input may be provided by a user of the on-demand services environment. The user may be composing a feed item to be published. The user may be associated with a hierarchical group of entities. The feed item may be an email, an information update, a social media message, or the like. The computing device may receive the textual input as the user types it in the textbox.

In FIG. 11, at block 1120, the computing device performing method 1100 identifies, in the textual input, a text pattern. The text pattern may include a common prefix followed by one or more characters. As described above, the services environment may designate a common prefix, or an invoke character such as "@", that a user may use to instruct the computing device that the subsequent characters identify an object record. For example, if a user wishes to identify the "Steve Smith" user account with a text pattern in the feed item, the user may type "@Steve Smith." The computing device may identify the "@" symbol preceding the name and begin to keep track of the subsequent characters. In some implementations, the step of identifying the text pattern may comprise identifying the common prefix in the textual data.

In FIG. 11, at block 1130, the computing device performing method 1100 transmits a portion of the text pattern to the server. In this example, the computing device transmits "Steve Smith" to the server to determine whether any object records match the characters "Steve Smith".

In FIG. 11, at block 1140, the computing device performing method 1100 receives, from the server, a subset of the hierarchical group of entities. The entities may stored in a database of a CRM or other database environment, and the entities may match the portion of the text pattern transmitted to the server. These entities may be identified as matching the one or more characters entered by the user in the textual input. In this way, the user may type the common prefix to search the server database for an entity that the user wishes to identify in an actionable text pattern in the feed item.

Figure 14:
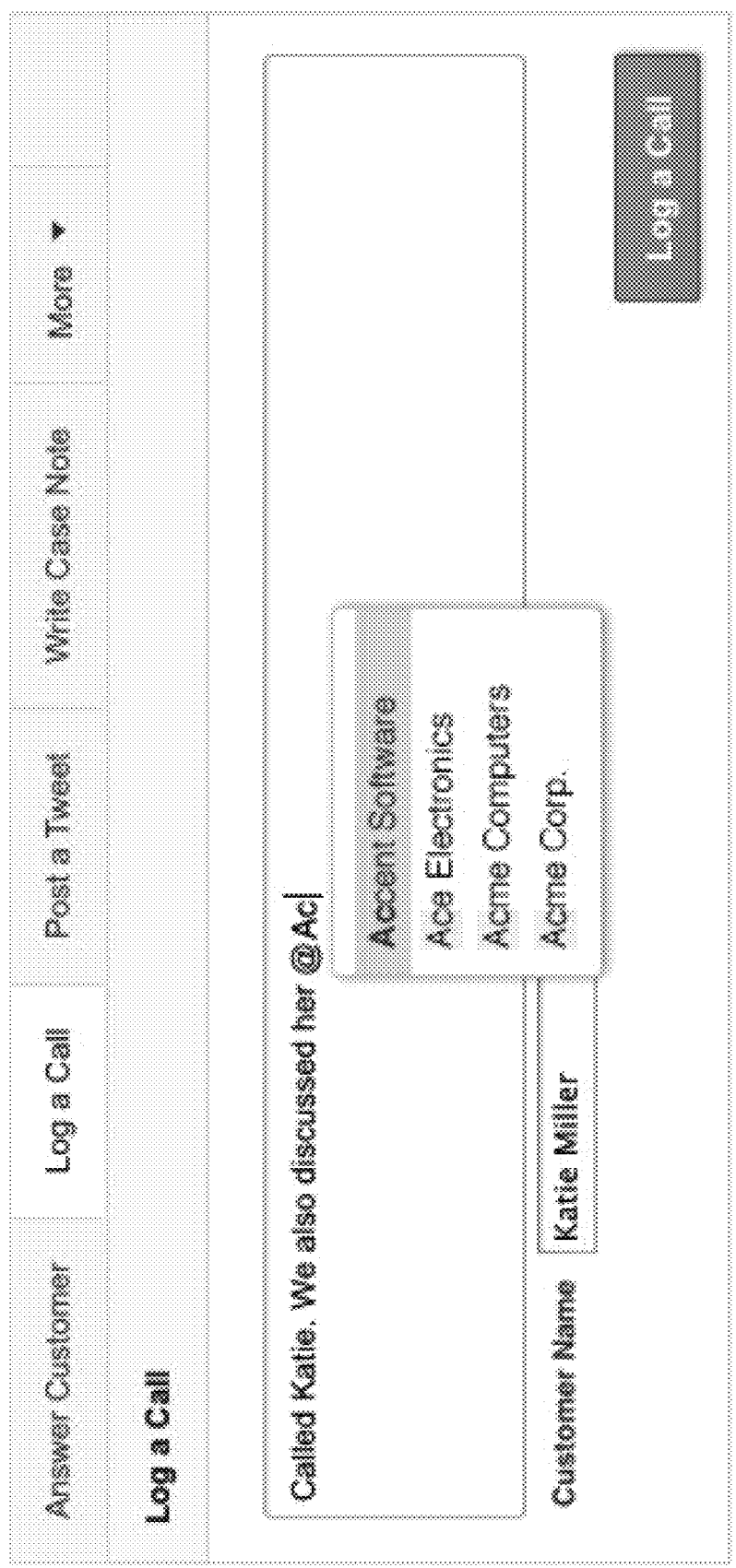
FIG. 14 shows an example of a GUI including a textbox for composing a feed item including an actionable text pattern, in accordance with one or more implementations.

FIG. 14 shows an example of a GUI including a textbox for composing a feed item including an actionable text pattern, in accordance with one or more implementations. In FIG. 14, the user has entered "@Ac" in the textbox. In this example, "@" is the common prefix for designating text patterns in feed items. The computing device identifies the common prefix, "@", followed by the characters "Ac" and transmits the characters "Ac" to the server. The server may respond with a list of object record names that begin with "Ac", such as "Accent Software", "Ace Electronics", "Acme Computers", and "Acme Corp." These names may be displayed in a dropdown list for the user to select one.

Figure 15:
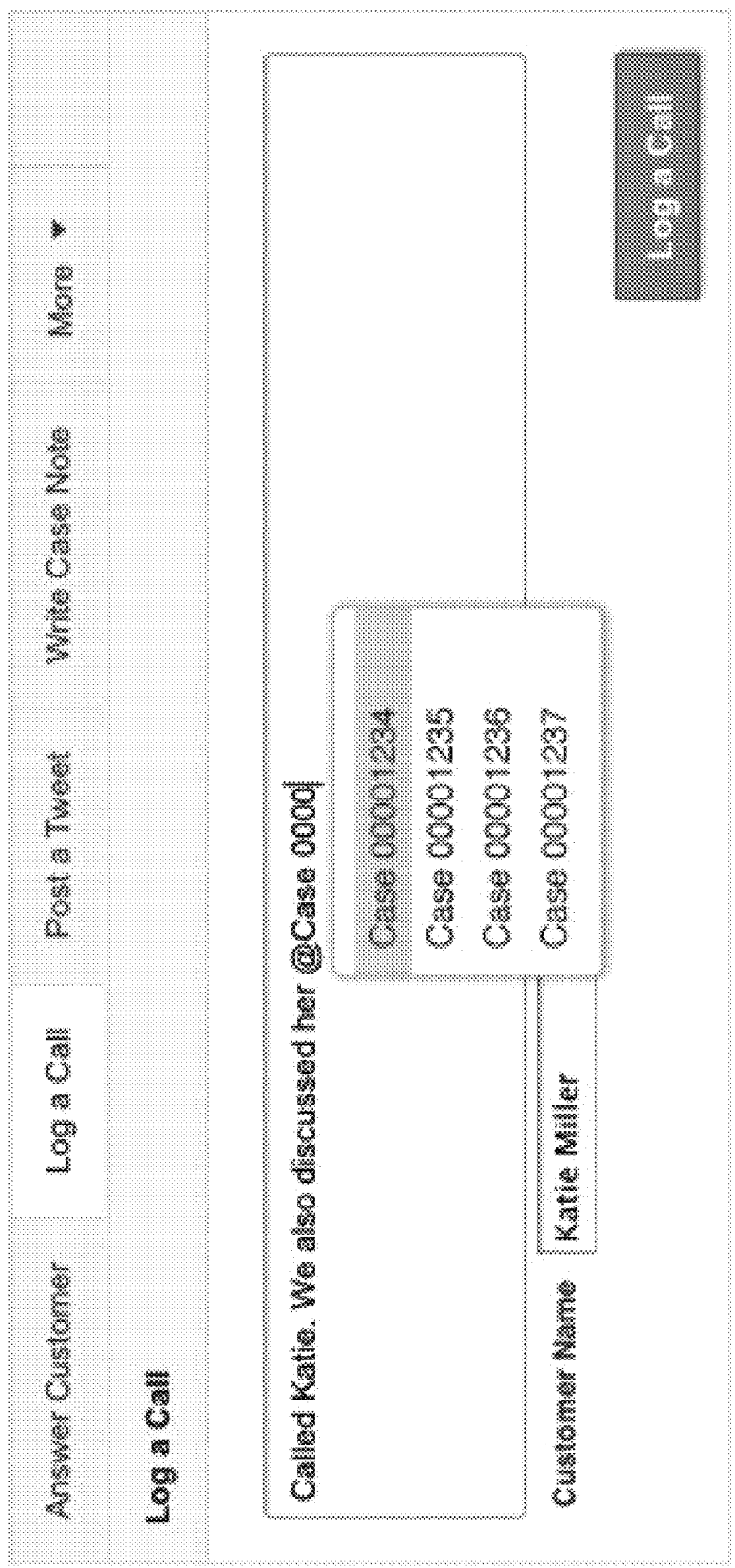
FIG. 15 shows an example of a GUI displaying textual data containing one or more actionable text patterns, in accordance with one or more implementations.

FIG. 15 shows an example of a GUI including a textbox for composing a feed item including an actionable text pattern, in accordance with one or more implementations. FIG. 15 shows a similar example, using the invoke character to identify a case record object.

In FIG. 11, at block 1150, the computing device performing method 1100 receives a selection of a first entity of the subset to be displayed as an actionable text pattern in the feed item when published.

In FIG. 11, at block 1160, the computing device performing method 1100 displays the selected first name at the computing device with or without the common prefix.

In FIG. 11, at block 1170, the computing device performing method 1100 transmits the feed item to be published.

In FIG. 11, at block 1180, the computing device performing method 1100 displays the selected first entity as an actionable text pattern in the published feed item. In some implementations, the actionable text pattern may be subsequently selected and the server may respond by transmitting data to display one or more attributes of the entity associated with the selected actionable text pattern.

In some implementations, the displayed actionable text pattern may include one or more indicators, and the indicators may be one or more of: underlining, highlighting, bolding, italicizing, or coloring the actionable text pattern. In some implementations, the one or more indicators of the actionable text pattern may become visible when the actionable text pattern is selected or hovered over.

In some implementations, a JavaScript framework that recognizes patterns of text based on patterns in objects of a CRM database may be implemented. For example, a contact has a name and phone number. In any text area, a name and a phone number may be recognized based on a match of a pattern of the name and the phone number.

Regular expressions may be used to recognize these patterns of data. A developer may then combine multiple regular expressions to match a particular type of contact record in the CRM database. For example, a patent record may have a title, inventors, a description, and a scrum team. A regular expression may be generated for each data attribute of the patent record. Some attributes may be optional while others may not be optional.

Patterns may be recognized in structured as well as unstructured data. For example, a wikipedia entry may include information that is useful to a customer service agent. The pattern matcher may parse through the text in the entry to find any regular expressions that match.

In some implementations, a note-taking salesperson may be typing notes during a call. The computing device may then recognize that a new contact record may be generated (which may later be matched and then associated with the note), recognize that an account is mentioned, recognize that a new opportunity might/should be generated based on a dollar amount being mentioned, etc.

In other implementations, based on a default or custom publisher for actions such as creating a task, creating an opportunity, logging a call, etc., a framework may recognize the patterns of data in plain text used to create a record based on the metadata included in the publisher. Accounts, contacts, opportunities may be included out of the box. Custom objects (e.g., new patent object) may be driven based on setup metadata. Suppose that a patent publisher is a custom publisher that creates a new patent object. The setup metadata may be used to drive the regular expressions.

In another implementation, customer service representatives may have long conversations with customers containing information that may be inputted into the case record (problem, product involved, etc.). Some implementations may be used to automatically surface the information that may be inputted into the case record based on the patterns.

In some implementations, metadata in the CRM or other database may be used to drive creation of patterns to be used for recognizing field types and objects. The patterns may be customized by one or more users, or the patterns may be set by default by an administrator of the system.

Figure 16:
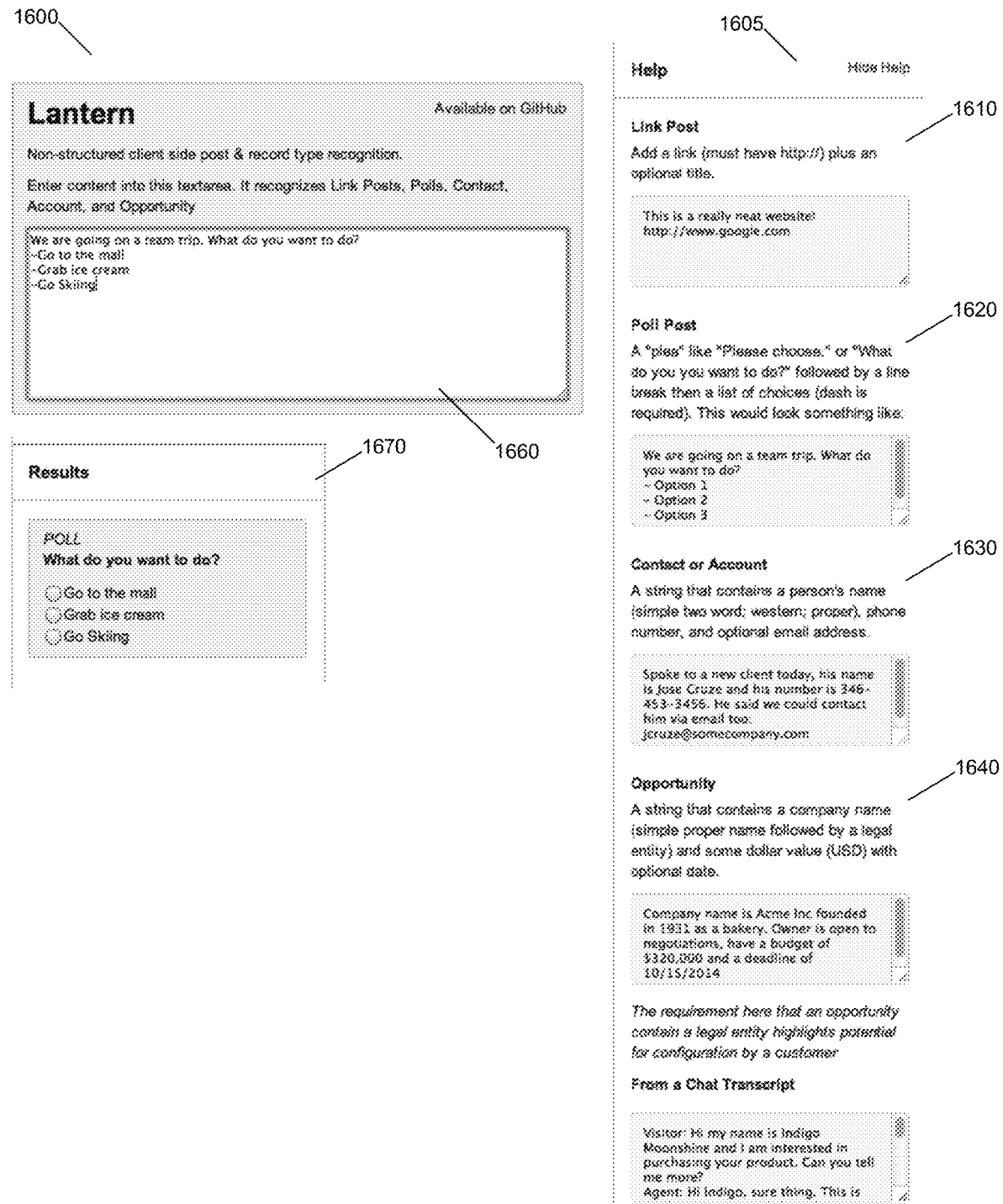
FIG. 16 shows an example of a GUI displaying textual data containing one or more actionable text patterns, in accordance with one or more implementations.

FIG. 16 shows an example of a GUI 1600 displaying textual data containing one or more actionable text patterns, in accordance with one or more implementations.

The help sidebar 1605 displays various texts containing various actionable text patterns that may be identified by a computing device. For example, to link a post 1610, the text may include a link having "http://" with an optional title. The computing device may recognize the link and turn that text into a hyperlink.

As another example, to create a poll post 1620, the text may include a "plea", such as "please choose" or "what do you want to do?" followed by a line break and a list of choices, each choice starting with a dash, as displayed in the textbox 1660. The computing device may recognize this pattern and create a poll in the published post, as in displayed in the result 1670.

As another example, to create a contact or account 1630, the text may include a string that contains a person's name, phone number, and optional email address. The computing device may recognize the name and phone number format, and create a contact having that contact information in response to receiving this text in a published post. Alternatively, the computing device may offer to create contact based on the information in the post.

In another example, the text may include a text string containing a company name and a dollar value with an optional date, as displayed in the "Opportunity" subheading 1640. The computing device receiving this text may respond by creating an opportunity containing the company name, dollar value, and date.

In these ways, a computing device may process a text item to perform actions in response to recognizable text patterns in the text.

In one implementation, a Javascript framework may be deployed for detecting patterns and extracting values from text. This may be particularly useful for record detection within notes, emails, and chat transcripts of, for example, a sales or service agent working in a CRM environment. A series of regular expressions may be utilized by a computing device to recognize data types in a text.

The following section describes an example of a Javascript framework, Lantern, that recognizes data types that are declared as "profiles" in a particular global namespace.

```
Lantern.addProfile(name String);
// Example
Lantern.addProfile('Contact');
```

Each profile may include at least one field. Now that a Contact profile has been added, it can be accessed to add a field:

```
Lantern.profiles.Contact.addField(name String, type Object, required Boolean);
// Example
Lantern.profiles.Contact.addField('emails', Lantern.fields.EMAIL);
``` addfield( ) takes three parameters: a string for the field name, a field type (custom or a Lantern field type), and an optional Boolean for whether or not it is a required field. If a field is marked as optional by providing "false" as the third parameter, that field will be accessible when the profile is matched but it is not taken into account when checking for matches. Field names may be plural since they are arrays of the matched strings.

Once a profile is built, matches may be identified in two ways:

```
// Check all profiles
Lantern.check(input String);
// Check specific profile
Lantern.profiles.Contact.check(inputString);
```

If there is an exact profile match in the input string, the profile that matches may fire its activate( ) method:

```
Lantern.profiles.Contact.activate = function ( ) {
  alert('Match!');
};
```

If there is no match for a profile, the profile may fire its suspend( ) method.

```
Lantern.profiles.Contact.suspend = function ( ) {
  alert('No Matches!');
};
```

Within the activate( ) method, matches may be processed using the following methods:

```
Lantern.profiles.Contact.activate = function ( ) {
  //returns the first email match wrapped in strong tags
  this.fields.emails.echo('<strong>', 0, '</strong>');
  // returns all email matches, each wrapped in strong tags
  this.fields.emails.echo('<strong>', '</strong>');
  // returns the first email match as a string
  this.fields.emails.echo(0);
  // returns all of the duplicate emails
  this.fields.emails.duplicates('<div><h2>Duplicate Emails</h2>', '<strong>', '</strong>', '</div>');
  // returns all of the duplicates
  this.duplicates('<div><h2>Do you want to use these fields instead?</h2>', '<strong>', '</strong>', '</div>');
}
``` echo( ) and duplicates( ) may return an empty string if there are no matches.

The results may then be added to a dom element as follows:

```
// duplicates with no parameters returns a string of matched results
$('#some_dom_id').append(this.duplicates( ));
// If you want to return the results as a string separated by a
delimiter such as a pipe (or a space, or a break tag etc), simply pass
that character
this.duplicates('', '','|', '');
```

The framework may include a set of default field types that define some common text patterns. For example:

```
// Lantern.fields.CONSTANT
Lantern.fields.URL;
Lantern.fields.EMAIL;
Lantern.fields.DATE;
```

Custom field types may be created as well. A Lantern field type may have two attributes: name String and reg RegularExpression. For example:

```
Lantern.fields.My_CUSTOM_FIELD = {
  name : 'my field',
  reg : /^[ABC]?[123]?/
}
```

After adding a field to a profile via Lantern.profiles.My-Profile.addField( ) that field has a property called matches Array that can be used to process the matched results.

```
// Globally
var emails = Lantern.profiles.Contact.fields.emails.matches;
// Local to the active method of a profile
var emails = this.fields.emails.matches;
// Then:
for (var i = 0; i < emails.length; i++) {
  console.log(emails[i]);
}
```

These and other aspects of the disclosure may be implemented by various types of hardware, software, firmware, etc. For example, some features of the disclosure may be implemented, at least in part, by machine-readable media that include program instructions, state information, etc., for performing various operations described herein. Examples of program instructions include both machine code, such as produced by a compiler, and files containing higher-level code that may be executed by the computer using an interpreter. Examples of machine-readable media include, but are not limited to, magnetic media such as hard disks, floppy disks, and magnetic tape; optical media such as CD-ROM disks; magneto-optical media; and hardware devices that are specially configured to store and perform program instructions, such as read-only memory devices ("ROM") and random access memory ("RAM").

While one or more implementations and techniques are described with reference to an implementation in which a service cloud console is implemented in a system having an application server providing a front end for an on-demand database service capable of supporting multiple tenants, the one or more implementations and techniques are not limited to multi-tenant databases nor deployment on application servers. Implementations may be practiced using other database architectures, i.e., ORACLE®, DB2® by IBM and the like without departing from the scope of the implementations claimed.

Any of the above implementations may be used alone or together with one another in any combination. Although various implementations may have been motivated by various deficiencies with the prior art, which may be discussed or alluded to in one or more places in the specification, the implementations do not necessarily address any of these deficiencies. In other words, different implementations may address different deficiencies that may be discussed in the specification. Some implementations may only partially address some deficiencies or just one deficiency that may be discussed in the specification, and some implementations may not address any of these deficiencies.

While various implementations have been described herein, it should be understood that they have been presented by way of example only, and not limitation. Thus, the breadth and scope of the present application should not be limited by any of the implementations described herein, but should be defined only in accordance with the following and later-submitted claims and their equivalents.

What is claimed is:

1. A system comprising:
a database system implemented using a server system comprising one or more hardware processors, the database system configurable to cause:
processing textual input for an electronic message capable of being transmitted in one or more data networks, the processing of the textual input comprising:
identifying, in the textual input, a plurality of text patterns as respective actionable elements,
determining, based on a first one or more of the identified text patterns, that a calendar appointment record is to be created or updated in a calendar database, and
determining, based on a second one or more of the identified text patterns, that a customer relationship management (CRM) record is to be created or updated in a CRM database different from the calendar database;
providing to a user device, responsive to determining that the CRM record is to be created or updated, first user interface data capable of being processed to cause display in a first user interface of a plurality of selectable CRM record options;
obtaining from the user device a selection of one of the CRM record options;
creating or updating the CRM record in the CRM database according to the selected CRM record option, at least a portion of a plurality of fields of the created or updated CRM record being automatically populated with the second one or more identified text patterns;
providing to the user device second user interface data capable of being processed to cause display in a second user interface of a graphical presentation of the calendar appointment record comprising a plurality of fields of the calendar appointment record, at least a portion of the fields of the calendar appointment record being automatically populated with:
the first one or more identified text patterns, and
an information identifying the created or updated CRM record, the information being selectable;
creating or updating the calendar appointment record in the calendar database; and
providing to the user device, responsive to obtaining from the user device a selection of the information identifying the created or updated CRM record, third user interface data capable of being processed to cause display in a third user interface of a graphical presentation of the created or updated CRM record providing editing of the created or updated CRM record using the user device.

2. The system of claim 1, wherein an identified text pattern includes a common prefix followed by one or more characters.

3. The system of claim 2, wherein identifying the text pattern comprises:
identifying the common prefix of the text pattern.

4. The system of claim 1, the database system further configurable to cause:
responsive to an instruction to publish a feed item comprising the textual input, publishing the feed item; and
displaying in the published feed item a presentation of the calendar appointment record.

5. The system of claim 1, wherein the information is in the form of a selectable link, and the created or updated CRM record is one or more of: an account record, an opportunity record, a task record, an activity record, a case record, a group record, an organization record, or a company record.

6. The system of claim 1, the database system further configurable to cause:
obtaining an indication of a selection of an actionable text pattern; and
displaying one or more attributes of the calendar appointment record on a display of the user device.

7. The system of claim 1, the database system further configurable to cause:
obtaining an indication of a selection of an actionable text pattern; and
displaying one or more options for actions associated with the calendar appointment record.

8. The system of claim 1, wherein an identified text pattern is indicated by one or more of: underlining, highlighting, bolding, italicizing, or coloring.

9. The system of claim 1, wherein an identified text pattern has a hidden state and a visible state triggered when the identified text pattern is selected or hovered over.

10. The system of claim 4, wherein the feed item is one of: an email, a comment, an information update, or a field.

11. A non-transitory computer-readable medium storing computer-readable program code capable of being executed by one or more processors, the program code comprising instructions configurable to cause:
processing textual input for an electronic message capable of being transmitted in one or more data networks, the processing of the textual input comprising:
identifying, in the textual input, a plurality of text patterns as respective actionable elements,
determining, based on a first one or more of the identified text patterns, that a calendar appointment record is to be created or updated in a calendar database, and
determining, based on a second one or more of the identified text patterns, a customer relationship management (CRM) record is to be created or updated in a CRM database different from the calendar database;
providing to a user device, responsive to determining that the CRM record is to be created or updated, first user interface data capable of being processed to cause display in a first user interface of a plurality of selectable CRM record options;
obtaining from the user device a selection of one of the CRM record options;
creating or updating the CRM record in the CRM database according to the selected CRM record option, at least a portion of a plurality of fields of the created or updated CRM record being automatically populated with the second one or more identified text patterns;
providing to the user device second user interface data capable of being processed to cause display in a second user interface of a graphical presentation of the calendar appointment record comprising a plurality of fields of the calendar appointment record, at least a portion of the fields of the calendar appointment record being automatically populated with:
the first one or more identified text patterns, and
an information identifying the created or updated CRM record, the information being selectable;
creating or updating the calendar appointment record in the calendar database; and
providing to the user device, responsive to obtaining from the user device a selection of the information identifying the created or updated CRM record, third user interface data capable of being processed to cause display in a third user interface of a graphical presentation of the created or updated CRM record providing editing of the created or updated CRM record using the user device.

12. The non-transitory computer-readable medium of claim 11, the instructions further configurable to cause:
responsive to an instruction to publish a feed item comprising the textual input, publishing the feed item; and
displaying in the published feed item a presentation of the calendar appointment record.

13. The non-transitory computer-readable medium of claim 11, the instructions further configurable to cause:
obtaining an indication of a selection of an actionable text pattern; and
displaying one or more options for responding to the calendar appointment record.

14. The non-transitory computer-readable medium of claim 11, wherein an identified text pattern is indicated by one or more of: underlining, highlighting, bolding, italicizing, or coloring.

15. The non-transitory computer-readable medium of claim 11, wherein the information is in the form of a selectable link, and the created or updated CRM record is one or more of: an account record, an opportunity record, a task record, an activity record, a case record, a group record, an organization record, or a company record.

16. The non-transitory computer-readable medium of claim 11, the instructions further configurable to cause:
obtaining an indication of a selection of an actionable text pattern; and
displaying one or more attributes of the calendar appointment record on a display of the user device.

17. The non-transitory computer-readable medium of claim 11, wherein an identified text pattern has a hidden state and a visible state triggered when the identified text pattern is selected or hovered over.

18. The non-transitory computer-readable medium of claim 12, wherein the feed item is one of: an email, a comment, an information update, or a field.

19. The non-transitory computer-readable medium of claim 11, wherein identifying a text pattern comprises:
identifying a format of the text pattern.

20. One or more computing devices comprising one or more processors configurable to cause:
processing textual input for an electronic message capable of being transmitted in one or more data networks, the processing of the textual input comprising:
identifying, in the textual input, a plurality of text patterns as respective actionable elements,
determining, based on a first one or more of the identified text patterns, that a calendar appointment record is to be created or updated in a calendar database, and
determining, based on a second one or more of the identified text patterns, that a customer relationship management (CRM) record is to be created or updated in a CRM database different from the calendar database;
providing to a user device, responsive to determining that the CRM record is to be created or updated, first user interface data capable of being processed to cause display in a first user interface of a plurality of selectable CRM record options;
obtaining from the user device a selection of one of the CRM record options;
creating or updating the CRM record in the CRM database according to the selected CRM record option, at least a portion of a plurality of fields of the created or updated CRM record being automatically populated with the second one or more identified text patterns;
providing to the user device second user interface data capable of being processed to cause display in a second user interface of a graphical presentation of the calendar appointment record comprising a plurality of fields of the calendar appointment record, at least a portion of the fields of the calendar appointment record being automatically populated with:
the first one or more identified text patterns, and
an information identifying the created or updated CRM record, the information being selectable;
creating or updating the calendar appointment record in the calendar database; and
providing to the user device, responsive to obtaining from the user device a selection of the information identifying the created or updated CRM record, third user interface data capable of being processed to cause display in a third user interface of a graphical presentation of the created or updated CRM record providing editing of the created or updated CRM record using the user device.

21. The one or more computing devices of claim 20, the one or more processors further configurable to cause:
responsive to an instruction to publish a feed item comprising the textual input, publishing the feed item; and
displaying in the published feed item a presentation of the calendar appointment record.

22. The one or more computing devices of claim 20, the one or more processors further configurable to cause:
obtaining an indication of a selection of an actionable text pattern; and
displaying one or more attributes of the calendar appointment record on a display of the user device.

23. A method comprising:
processing textual input for an electronic message capable of being transmitted in one or more data networks, the processing of the textual input comprising:
identifying, in the textual input, a plurality of text patterns as respective actionable elements,
determining, based on a first one or more of the identified text patterns, that a calendar appointment record is to be created or updated in a calendar database, and
determining, based on a second one or more of the identified text patterns, that a customer relationship management (CRM) record is to be created or updated in a CRM database different from the calendar database;
providing to a user device, responsive to determining that the CRM record is to be created or updated, first user interface data capable of being processed to cause display in a first user interface of a plurality of selectable CRM record options;
obtaining from the user device a selection of one of the CRM record options;
creating or updating the CRM record in the CRM database according to the selected CRM record option, at least a portion of a plurality of fields of the created or updated CRM record being automatically populated with the second one or more identified text patterns;
providing to the user device second user interface data capable of being processed to cause display in a second user interface of a graphical presentation of the calendar appointment record comprising a plurality of fields of the calendar appointment record, at least a portion of the fields of the calendar appointment record being automatically populated with:
the first one or more identified text patterns, and
an information identifying the created or updated CRM record, the information being selectable;
creating or updating the calendar appointment record in the calendar database; and
providing to the user device, responsive to obtaining from the user device a selection of the first information identifying the created or updated CRM record, third user interface data capable of being processed to cause display in a third user interface of a graphical presentation of the created or updated CRM record providing editing of the created or updated CRM record using the user device.

24. The method of claim 23, further comprising:
responsive to an instruction to publish a feed item comprising the textual input, publishing the feed item; and
causing display, in the published feed item, of a presentation of the calendar appointment record.

25. The method of claim 23, further comprising:
obtaining an indication of a selection of an actionable text pattern; and
causing display of one or more attributes of the calendar appointment record on a display of the user device.

* * * * *